(12) United States Patent
Matsuda et al.

(10) Patent No.: US 9,127,366 B2
(45) Date of Patent: Sep. 8, 2015

(54) ZINC-BASED METAL COATED STEEL SHEET

(75) Inventors: Takeshi Matsuda, Kawasaki (JP); Akira Matsuzaki, Chiba (JP); Katsutoshi Takashima, Fukuyama (JP)

(73) Assignee: JFE Steel Corporation, Tokyo (JP)

( * ) Notice: Subject to any disclaimer, the term of this patent is extended or adjusted under 35 U.S.C. 154(b) by 109 days.

(21) Appl. No.: 13/822,748

(22) PCT Filed: Sep. 28, 2011

(86) PCT No.: PCT/JP2011/072909
§ 371 (c)(1),
(2), (4) Date: May 20, 2013

(87) PCT Pub. No.: WO2012/043868
PCT Pub. Date: Apr. 5, 2012

(65) Prior Publication Data
US 2013/0302637 A1    Nov. 14, 2013

(30) Foreign Application Priority Data
Sep. 29, 2010  (JP) ................................. 2010-220050

(51) Int. Cl.
| | |
|---|---|
| *B32B 15/04* | (2006.01) |
| *B32B 15/08* | (2006.01) |
| *B32B 15/18* | (2006.01) |
| *C23C 22/73* | (2006.01) |
| *C09D 5/08* | (2006.01) |
| *C23C 22/40* | (2006.01) |
| *C23C 22/42* | (2006.01) |
| *C23C 22/44* | (2006.01) |
| *B05D 3/02* | (2006.01) |

(52) U.S. Cl.
CPC .............. *C23C 22/73* (2013.01); *B05D 3/0254* (2013.01); *C09D 5/08* (2013.01); *C23C 22/40* (2013.01); *C23C 22/42* (2013.01); *C23C 22/44* (2013.01); *C23C 2222/20* (2013.01)

(58) Field of Classification Search
CPC ...... B32B 15/04; B32B 15/08; B32B 15/082; B32B 15/095; B32B 15/18; B32B 27/308; B32B 27/40; B32B 2375/00; C23C 22/00; C23C 22/06; C23C 22/82; C23C 28/00; C23C 222/20
USPC ......... 428/623, 624, 626, 659, 684, 685, 215, 428/216, 220, 336, 332
See application file for complete search history.

(56) References Cited

U.S. PATENT DOCUMENTS

| | | | |
|---|---|---|---|
| 2006/0177685 A1* | 8/2006 | Matsuda et al. .............. | 428/621 |
| 2012/0208043 A1* | 8/2012 | Matsuda et al. .............. | 428/623 |
| 2013/0177779 A1* | 7/2013 | Matsuda et al. .............. | 428/626 |

FOREIGN PATENT DOCUMENTS

| | | |
|---|---|---|
| EP | 1 852 523 A1 | 11/2007 |
| JP | 2000-144449 A | 5/2000 |
| JP | 2000-290782 A | 10/2000 |
| JP | 2001-158973 A | 6/2001 |
| JP | 2001-181860 A | 7/2001 |
| JP | 2001-234358 A | 8/2001 |
| JP | 2001-271175 A | 10/2001 |
| JP | 2002-030459 A | 1/2002 |
| JP | 2002-053979 A | 2/2002 |
| JP | 2002-053980 A | 2/2002 |
| JP | 2002-105658 A | 4/2002 |
| JP | 3302677 B2 | 7/2002 |
| JP | 2003-013252 A | 1/2003 |
| JP | 2003-155452 A | 5/2003 |
| JP | 2003-171778 A | 6/2003 |
| JP | 2004-018887 A | 1/2004 |
| JP | 2004-183015 A | 7/2004 |
| JP | 3549455 B2 | 8/2004 |
| JP | 2004-263252 A | 9/2004 |
| JP | 3596665 B2 | 12/2004 |
| JP | 2005-048199 A | 2/2005 |
| JP | 2005-120469 A | 5/2005 |
| JP | 2005-194627 A | 7/2005 |
| JP | 2006-213958 A | 8/2006 |
| JP | 2007-177314 A | 7/2007 |
| JP | 2007-270302 A | 10/2007 |
| JP | 2008-169470 A | 7/2008 |
| JP | 2008-274388 A | 11/2008 |
| JP | 2009-127061 A | 6/2009 |
| WO | WO2011/052701 | * 5/2011 |

OTHER PUBLICATIONS

Machine Translation, Tonaka et al., JP 2007-177314, Jul. 2007.*
Machine Translation, Okai et al., JP 2005-048199, Feb. 2005.*
International Search Report dated Jan. 10, 2012, application No. PCT/JP2011/072909.
Supplementary European Search Report dated Aug. 6, 2014, application No. EP 11 82 9419.

* cited by examiner

*Primary Examiner* — Michael E La Villa

(74) *Attorney, Agent, or Firm* — RatnerPrestia

(57) ABSTRACT

A surface treatment liquid contains a resin emulsion that contains a cationic urethane resin emulsion and/or a nonionic acrylic resin emulsion, a tetraalkoxysilane, at least one silane coupling agent (c) that contains at least one reactive functional group selected from active hydrogen-containing amino group, an epoxy group, a mercapto group, and a methacryloxy group, a chelating agent (d), a vanadic acid compound (e), a titanium compound (f), and water in a specific ratio. The surface treatment liquid has a pH of 3 to 6. The surface treatment liquid is applied to a surface of a zinc-based metal coated steel sheet and dried by heating to form a first layer. Next, a surface treatment liquid containing an organic resin is applied to a surface of the first layer and dried by heating to form a second layer.

6 Claims, No Drawings

ZINC-BASED METAL COATED STEEL SHEET

CROSS REFERENCE TO RELATED APPLICATIONS

This application is the U.S. National Phase application of PCT International Application No. PCT/JP2011/072909, filed Sep. 28, 2011, and claims priority to Japanese Patent Application No. 2010-220050, filed Sep. 29, 2010, the disclosures of both being incorporated herein by reference in their entireties for all purposes.

FIELD OF THE INVENTION

The present invention relates to an environmentally friendly, surface-treated zinc-based metal coated steel sheet for use in, for example, automobiles, household electric appliances, and building materials, the zinc-based metal coated steel sheet being subjected to surface treatment to form a surface treatment film free from a pollution control substance, such as hexavalent chromium. In particular, the present invention relates to a zinc-based metal coated steel sheet having excellent electromagnetic wave shielding properties and corrosion resistance and suitably used for, for example, electric and electronic equipment, which is required to prevent electromagnetic interference (EMI).

BACKGROUND OF THE INVENTION

With the recent digitization of household electrical appliances and increase in the speed of CPUs, importance has been attached to problems with electromagnetic interference that adversely affects peripheral equipment and the human body. To address the problems, in our country, the "Voluntary Control Council for Interference by Information Technology Equipment (VCCI)" has been established. In these days, to comply with the standards of VCCI, there is a strong tendency to exercise voluntary restraint on the problems with electromagnetic interference. As an example of countermeasures against electromagnetic noise generated from electronic substrates in electric and electronic equipment, there is a technique for shielding electromagnetic waves by surrounding electronic substrates and so forth with a shield box composed of a metal (conductive) material.

For the shield box, the conductive material constituting the shield box reflects electromagnetic waves to shield electromagnetic waves. A higher conductivity of the material constituting the shield box results in higher reflectance to electromagnetic waves, improving electromagnetic wave shielding properties. So, in order to ensure the electromagnetic wave shielding properties, it is important that a metal plate constituting the shield box should have high conductivity.

The shield box is produced by forming a metal sheet and thus has discontinuities (joints and junctions). The discontinuities are likely to cause the leakage or penetration of electromagnetic waves. For the shield box, thus, a conductive gasket is usually interposed in the discontinuities to prevent the leakage and penetration of electromagnetic waves.

Here, to further ensure the shielding properties of the shield box, it is necessary to form a structure in such a manner that a desired current can be passed through the entire shield box. However, the contact pressure is usually low at a contact portion between the metal body and the gasket. So, the electrical conductivity (hereinafter, referred to simply as "conductivity") between the metal body and the gasket is low. The amount of current passing through the contact portion tends to be reduced. Thus, in addition to ensuring the conductivity of the metal plate constituting the shield box, ensuring the conductivity between the metal plate and the gasket is important to achieve higher performance of the shield box.

Nowadays, electric and electronic equipment is used in all environments. A material constituting the shield box is required to have excellent corrosion resistance even under a severe usage environment. Chromate treatment is known as a typical method for improving the corrosion resistance (resistance to white rust and red rust) of a zinc-based metal coated steel sheet. Traditionally, zinc-based metal coated steel sheets subjected to chromate treatment with a treatment liquid mainly containing chromic acid, dichromic acid, or salts thereof have been widely used as steel sheets for household electrical appliances, steel sheets for building materials, and steel sheets for automobiles.

As described above, the metal body (steel sheet) constituting the shield box is required to have high conductivity and conductivity between metal body and the gasket. Here, although a film formed on a surface of the steel sheet by chromate treatment has lower conductivity than the base steel sheet, the film formed by chromate treatment provides rust preventive performance even at a small thickness. So, in the case of a surface-treated steel sheet subjected to chromate treatment, minimizing the thickness of the film having inferior conductivity provides conductivity comparable to a steel sheet (without being subjected to surface treatment). It is thus possible to ensure sufficient conductivity between the steel sheet and the gasket, thereby striking a good balance between rust preventive performance and electromagnetic wave shielding properties. However, recent global environmental issues require a pollution-free surface-treated steel sheet, i.e., a chromium-free treatment steel sheet, without using chromate treatment.

Many techniques about chromium-free treatment steel sheet have been reported. Examples of the techniques that have been reported include a technique of using a passivation effect of molybdic acid and tungstic acid, which belong to the IVA group the same as chromic acid; a technique of using metal salts of transition metals, such as Ti, Zr, V, Mn, Ni, and Co, and rare-earth elements, such as La and Ce; a technique based on polyhydric phenol carboxylic acid, such as tannic acid, and a chelating agent, such as a compound containing S or N; a technique of forming a polysiloxane film with a silane coupling agent; and combinations of these techniques.

Specific examples are as follows:

(1) a technique for forming a film from a treatment liquid containing a covering agent prepared by reaction of an organic resin, such as a polyvinylphenol derivative, an acid component, and an epoxy compound, a silane coupling agent, a vanadium compound, and so forth (for example, PTLs 1, 2, 3, and 4);

(2) a technique for forming a film containing a water-based resin, a thiocarbonyl group, a vanadic acid compound, and phosphoric acid (for example, PTL 5);

(3) a technique for forming a film from a treatment liquid containing a metal compound, such as Ti, a fluoride, an inorganic acid, such as phosphate compound, and an organic acid (PTLs 6, 7, 8, 9, 10, 11, and 12);

(4) a technique in which a composite film composed of rare-earth elements, such as Ce, La, and Y, and Ti and Zr elements is formed and in which in the film, an oxide layer is thickened on the coated layer side, and a hydroxide layer is thickened on the surface side (PTL 13), and a technique for forming a composite film of Ce and Si oxide (PTL 14);

(5) a technique for forming an organic composite coating including an oxide-containing phosphoric acid and/or phosphate compound film serving as a lower layer and a resin film serving as an upper layer (for example, PTLs 15 and 16); and (6) a technique for forming a composite film including a specific inhibitor component and a silica/zirconium compound (for example, PTL 17).

The films formed by these techniques aim to inhibit the occurrence of white rust by combined addition of the organic components or inorganic components. For example, in each of the techniques of items (1) and (2), the corrosion resistance is ensured by mainly adding the organic resin. For such film composition containing the organic resin, however, the organic resin is insulative. So, the steel sheet including the film does not have sufficient conductivity and thus is not suitable as a material for the shield box.

In each of the techniques of items (3) and (4), the inorganic film free from an organic component is reported. The composite film composed of the metal oxide and metal hydroxide is required to have an increased thickness in order to provide sufficient corrosion resistance. Furthermore, a surface of the zinc coated steel sheet is covered with a nonconductive film (insulative film) composed of, for example, zinc phosphate. So, it is disadvantageous to provide satisfactory conductivity, and it is thus difficult to strike a balance between the corrosion resistance and the conductivity.

In the technique of item (5), attention is focused on the dependence of the conductivity of a surface of the surface-treated steel sheet on the thickness of the insulating film covering the surface. The technique aims to provide satisfactory conductivity by reducing the thickness of the insulating film. However, a smaller thickness results in a reduction in the corrosion resistance of the steel sheet. It is thus difficult to provide a surface-treated steel sheet having excellent corrosion resistance and conductivity.

In the technique of item (6), the use of the passivation effect of the vanadic acid compound and a sparingly soluble metal salt due to the phosphate compound, which serve as the inhibitor components, and the formation of the composite film, serving as a skeletal film, composed of the zirconium compound, fine particle silica, and the silane coupling agent provide excellent corrosion resistance. However, in the case where conduction is required under severe conditions where contact is established at a very low load, it is necessary to reduce the thickness of the film, thus causing difficulty in striking a balance between the corrosion resistance and the conductivity.

As described above, for the chromium-free treatment steel sheets reported so far, in order to ensure corrosion resistance comparable to that of a traditional chromate film, it is necessary to increase the thickness of a highly insulative film. For the chromium-free treatment steel sheets, it is thus difficult to ensure conductivity. The steel sheets do not sufficiently satisfy the properties required for a steel sheet constituting the shield box. As described above, in order to further ensure the shielding properties of the shield box, the conductivity between the metal body (steel sheet) and the gasket at a low contact pressure needs to be sufficiently ensured. However, in the foregoing techniques, the conductivity is not considered.

PATENT LITERATURE

PTL 1: Japanese Unexamined Patent Application Publication No. 2003-13252
PTL 2: Japanese Unexamined Patent Application Publication No. 2001-181860
PTL 3: Japanese Unexamined Patent Application Publication No. 2004-263252
PTL 4: Japanese Unexamined Patent Application Publication No. 2003-155452
PTL 5: Japanese Patent No. 3549455
PTL 6: Japanese Patent No. 3302677
PTL 7: Japanese Unexamined Patent Application Publication No. 2002-105658
PTL 8: Japanese Unexamined Patent Application Publication No. 2004-183015
PTL 9: Japanese Unexamined Patent Application Publication No. 2003-171778
PTL 10: Japanese Unexamined Patent Application Publication No. 2001-271175
PTL 11: Japanese Unexamined Patent Application Publication No. 2006-213958
PTL 12: Japanese Unexamined Patent Application Publication No. 2005-48199
PTL 13: Japanese Unexamined Patent Application Publication No. 2001-234358
PTL 14: Japanese Patent No. 3596665
PTL 15: Japanese Unexamined Patent Application Publication No. 2002-53980
PTL 16: Japanese Unexamined Patent Application Publication No. 2002-53979
PTL 17: Japanese Unexamined Patent Application Publication No. 2008-169470

SUMMARY OF THE INVENTION

The present invention provides a zinc-based metal coated steel sheet including a surface treatment film free from a pollution control substance, such as hexavalent chromium, the steel sheet having excellent conductivity even under severe conditions where the steel sheet is in contact with, for example, a gasket at a low contact pressure without reducing corrosion resistance.

To overcome the foregoing problems, the inventors have conducted intensive studies and have found the following: A surface treatment liquid (A) is applied to a surface of a zinc-based metal coated layer and dried by heating to form a first layer composed of a composite oxide film, the surface treatment liquid (A) containing a resin emulsion that contains a cationic urethane resin emulsion and/or a nonionic acrylic resin emulsion, the cationic urethane resin emulsion containing at least one cationic functional group selected from primary to tertiary amino groups and quaternary ammonium salt groups, a tetraalkoxysilane, at least one silane coupling agent that contains at least one reactive functional group selected from active hydrogen-containing amino groups, an epoxy group, a mercapto group, and a methacryloxy group, a chelating agent, a vanadic acid compound, a titanium compound, and water in a specific ratio. A surface treatment liquid (B) containing an organic resin is applied to a surface of the first layer and dried by heating to form a second layer, thereby overcoming the foregoing problem.

The foregoing findings have led to the completion of the present invention. The outline of exemplary embodiments of the present invention is described below.
(1) A zinc-based metal coated steel sheet includes a surface film arranged on a surface of a zinc-based metal coated layer, the surface film having a two-layer structure including a first layer and a second layer,
  in which the first layer is formed by applying a surface treatment liquid (A) for a zinc-based metal coated steel sheet to the surface of the zinc-based metal coated layer and performing drying by heating, the surface treatment liquid (A)

containing a resin emulsion (a) that contains a cationic urethane resin emulsion (a-1) and/or a nonionic acrylic resin emulsion (a-2), the cationic urethane resin emulsion (a-1) containing at least one cationic functional group selected from primary to tertiary amino groups and quaternary ammonium salt groups, a tetraalkoxysilane (b), at least one silane coupling agent (c) that contains at least one reactive functional group selected from active hydrogen-containing amino groups, an epoxy group, a mercapto group, and a methacryloxy group, a chelating agent (d), a vanadic acid compound (e), a titanium compound (f), and water, the surface treatment liquid (A) having a pH of 3 to 6 and being adjusted so as to satisfy requirements (I) to (V) described below, in which the second layer is formed by applying a surface treatment liquid (B) that contains an organic resin (g) to a surface of the first layer and performing drying by heating, and in which the total thickness of the first layer and the second layer is in the range of 0.1 to 3.0 µm per side:

(I) the proportion of the solid ($a_S$) of the resin emulsion (a) is in the range of 11% to 45% by mass with respect to the total solid of the treatment liquid;

(II) the ratio by mass of the solid of the silane coupling agent (c) to the solid of the resin emulsion (a), i.e., ($c_S/a_S$), is in the range of 1.51 to 5.35;

(III) the ratio by mass of the solid of the tetraalkoxysilane (b) to the solid of the chelating agent (d), i.e., ($b_S/d_S$), is in the range of 0.15 to 1.49;

(IV) the ratio of the mass ($e_V$) of the vanadic acid compound (e) in terms of V to the mass of the solid ($d_S$) of the chelating agent (d), i.e., ($e_V/d_S$), is in the range of 0.03 to 0.23; and (V) the ratio of the mass ($f_T$) of the titanium compound (f) in terms of Ti to the mass of the solid ($d_S$) of the chelating agent (d), i.e., ($f_T/d_S$), is in the range of 0.02 to 0.19.

(2) In the zinc-based metal coated steel sheet described in item (1), the organic resin (g) in the surface treatment liquid (B) contains an organic resin (g-1) that contains an OH group and/or a COOH group.

(3) In the zinc-based metal coated steel sheet described in item (1), the organic resin (g) in the surface treatment liquid (B) contains a hydrazine-modified organic resin (g-2) formed by reaction with an active hydrogen-containing compound (i) composed of a hydrazine derivative (h) in which some or all of compounds contain active hydrogen.

(4) In the zinc-based metal coated steel sheet described in any one of items (1) to (3), the surface treatment liquid (B) further contains a rust preventive additive (j).

(5) In the zinc-based metal coated steel sheet described in item (4), the rust preventive additive (j) contains (k) and/or (l) described below, the proportion of the rust preventive additive (k) is in the range of 1 to 100 parts by mass in terms of the solid content with respect to the total amount of 100 parts by mass of the organic resin (g) in the surface treatment liquid (B):

(k) Ca ion-exchanged silica; and
(l) silicon oxide.

(6) In the zinc-based metal coated steel sheet described in any one of items (1) to (5), the surface treatment liquid (B) further contains a lubricant (m).

According to the present invention, it is possible to provide a zinc-based metal coated steel sheet having excellent properties, such as corrosion resistance and adhesion, and having excellent conductivity even under severe conditions where the steel sheet is in contact with, for example, a gasket at a low contact pressure, in particular, without reducing corrosion resistance.

DETAILED DESCRIPTION OF EMBODIMENTS OF THE INVENTION

The present invention according to exemplary embodiments will be specifically described below.

<Zinc-Based Metal Plated Steel Sheet>

Examples of a zinc-based metal coated steel sheet according to the present invention include, but are not particularly limited to, a hot-dip galvanized steel sheet (GI), a hot-dip galvannealed steel sheet (GA) produced by alloying the galvanized steel sheet, a hot-dip 5 mass % Al—Zn alloy coated steel sheet (GF), a hot-dip Zn-55 mass % Al—Zn alloy steel sheet (GL), an electrogalvanized steel sheet (EG), and a Ni—Zn (11 mass % Ni—Zn) alloy electroplated steel sheet.

<First Coating Film>

In embodiments of the present invention, a surface treatment liquid (A) is applied to a surface of a zinc-based metal coated layer of a zinc-based metal coated steel sheet and dried by heating to form a first layer. The first layer formed from the surface treatment liquid (A) is composed of a composite oxide and has satisfactory heat resistance, weldability, and adhesion and excellent conductivity. So, in the present invention, the first layer plays an important role in providing a zinc-based metal coated steel sheet having excellent conductivity even under severe conditions where the steel sheet is in contact with, for example, a gasket at a low contact pressure, in particular, without reducing corrosion resistance.

(Surface Treatment Liquid (A))

The surface treatment liquid (A) for a zinc-based metal coated steel sheet used in the present invention preferably contains a resin emulsion (a) composed of a cationic urethane resin emulsion (a-1) and/or a nonionic acrylic resin emulsion (a-2), a tetraalkoxysilane (b), a silane coupling agent (c), a chelating agent (d), a vanadic acid compound (e), a titanium compound (f), and water.

The formation of a surface treatment film on a surface of a zinc-based metal coated steel sheet by the use of the surface treatment liquid containing the cationic urethane resin emulsion (a-1) and/or nonionic acrylic resin emulsion (a-2) provides the zinc-based metal coated steel sheet having excellent properties, such as corrosion resistance, adhesion of the formed film, and corrosion resistance after alkaline degreasing, and having excellent formability, which is a characteristic of a resin film-coated steel sheet.

With respect to a cationic urethane resin contained in the cationic urethane resin emulsion (a-1), a polyol, a isocyanate component, which are monomer components of the resin, and a polymerization method are not particularly limited as long as the cationic urethane resin contains at least one cationic functional group selected from primary to tertiary amino groups and quaternary ammonium salt groups. Examples of the cationic functional group include an amino group, a methylamino group, an ethylamino group, a dimethylamino group, a diethylamino group, a trimethylamino group, and a triethylamino group. However, the cationic functional group is not limited as long as it is a primary, secondary, or tertiary amino group, or a quaternary ammonium salt group and the performance of the present invention is not impaired.

The type of nonionic acrylic resin emulsion (a-2) is not particularly limited. Examples of the nonionic acrylic resin emulsion (a-2) that may be used include acrylic resins emulsified with nonionic emulsifiers, for example, aqueous emulsions each prepared by emulsion polymerization of a vinyl monomer, such as acrylic acid, methacrylic acid, acrylic ester, methacrylic ester, and styrene, in water in the presence of a nonionic surfactant (emulsifier) having a structure of polyethylene oxide or polypropylene oxide.

The proportion of the solid ($a_S$) of the resin emulsion (a) containing the cationic urethane resin emulsion (a-1) and/or nonionic acrylic resin emulsion (a-2) is in the range of 11% to 45% by mass and preferably 15% to 30% by mass with respect to the total solid of the treatment liquid. A proportion of the solid of the resin emulsion (a) of less than 11% by mass does not result in a zinc-based metal coated steel sheet having excellent adhesion. A proportion exceeding 45% by mass results in a reduction in corrosion resistance.

The surface treatment liquid (A) contains the tetraalkoxysilane (b) together with the resin emulsion (a). The formation of a surface treatment film on a zinc-based metal coated steel sheet by the use of the surface treatment liquid containing the tetraalkoxysilane (b) provides the zinc-based metal coated steel sheet having excellent properties, such as corrosion resistance, adhesion of the formed film, and corrosion resistance after alkaline degreasing, and having excellent heat resistance and weldability, which are characteristics of an inorganic film. Although the reason these excellent properties are obtained is not clear, it is speculated that these excellent properties are attributed to the fact that the use of the tetraalkoxysilane (b) in combination with the resin emulsion (a) results in the formation of a film having a three-dimensional cross-linked structure composed of the tetraalkoxysilane (b) and the cationic urethane resin and/or the nonionic acrylic resin.

Examples of the tetraalkoxysilane (b) include, but are not particularly limited to, tetramethoxysilane, tetraethoxysilane, and tetrapropoxysilane. One or more thereof may be used. Among these, tetraethoxysilane and tetramethoxysilane are preferred from the viewpoint of providing better corrosion resistance of a zinc-based metal coated steel sheet.

The surface treatment liquid (A) contains at least one silane coupling agent (c) containing at least one reactive functional group selected from an active hydrogen-containing amino group, an epoxy group, a mercapto group, and a methacryloxy group, together with the resin emulsion (a) and the tetraalkoxysilane (b). The formation of a surface treatment film on a zinc-based metal coated steel sheet by the use of the surface treatment liquid containing the silane coupling agent (c) provides the zinc-based metal coated steel sheet having excellent properties, such as corrosion resistance and corrosion resistance after alkaline degreasing. In particular, the surface treatment film having excellent adhesion and scratch resistance is formed on a surface of the zinc-based metal coated layer.

The type of at least one silane coupling agent (c) containing at least one reactive functional group selected from an active hydrogen-containing amino group, an epoxy group, a mercapto group, and a methacryloxy group is not particularly limited. For example, trialkoxysilanes each having three alkoxy groups and at least one reactive functional group selected from an active hydrogen-containing amino group, an epoxy group, a mercapto group, and a methacryloxy group are preferred. At least one of these trialkoxysilanes is preferably used. Specific examples of trialkoxysilanes that may be used include, but are not particularly limited to, N-(aminoethyl)-3-aminopropyltrimethoxysilane, 3-aminopropyltrimethoxysilane, 3-glycidoxypropyltrimethoxysilane, 3-glycidoxypropylmethyldimethoxysilane, 2-(3,4epoxycyclohexyl) ethyltriethoxysilane, vinyltriethoxysilane, and 3-mercaptopropyltrimethoxysilane.

The proportion of at least one silane coupling agent (c) selected from an active hydrogen-containing amino group, an epoxy group, a mercapto group, and a methacryloxy group is in the range of 1.51 to 5.35 and preferably 2.0 to 5.0 in terms of the ratio by mass of the solid of the silane coupling agent (c) to the solid of the resin emulsion (a), i.e., ($c_S/a_S$). A ratio by mass of less than 1.51 does not result in a zinc-based metal coated steel sheet having excellent corrosion resistance. A ratio by mass exceeding 5.35 results in a reduction in the adhesion of the film.

For the purpose of ensuring the shelf stability (storage stability) of the surface treatment liquid, the surface treatment liquid contains the chelating agent (d). It is speculated that the reason desired shelf stability can be ensured is that the chelating agent (d) has the effect of suppressing the polymerization of the tetraalkoxysilane (b) in the surface treatment liquid. It is speculated that owing to the effect, the quality of the surface treatment liquid at the time of preparation is maintained without alteration even if the surface treatment liquid is stored for an extended period of time after preparation. The chelating agent (d) is needed to stably dissolve the vanadic acid compound (e) and the titanium compound (f), which are described below, in the surface treatment liquid. Furthermore, the chelating agent (d) is less likely to etch a surface of a zinc-based metal coated layer and does not form a nonconductive film composed of, for example, zinc phosphate, as compared with inorganic acids, such as nitric acid, phosphoric acid, sulfuric acid, and hydrofluoric acid. It is thus speculated that a zinc-based metal coated steel sheet including a film formed by the use of the surface treatment liquid containing the chelating agent (d) has better conductivity.

Examples of the chelating agent (d) include, but are not particularly limited to, hydroxycarboxylic acids, such as acetic acid, tartaric acid, and malic acid, monocarboxylic acids, polycarboxylic acids, such as dicarboxylic acids, e.g., oxalic acid, malonic acid, succinic acid, citric acid, and adipic acid, and tricarboxylic acids, aminocarboxylic acids, such as glycine, phosphonic acid, and phosphonate. One or more of these chelating agents may be used. In particular, a compound containing a carboxy group or a phosphonate group in its one molecule is preferred in view of the shelf stability (storage stability) of the surface treatment liquid and the corrosion resistance and conductivity of the zinc-based metal coated steel sheet.

The proportion of the chelating agent (d) is in the range of 0.15 to 1.49 and preferably 0.17 to 1.30 in terms of the ratio by mass of the solid of the tetraalkoxysilane (b) to the solid of the chelating agent (d), i.e., ($b_S/d_S$). In each of the cases where a ratio by mass of less than 0.15 and where a ratio by mass of more than 1.49, a zinc-based metal coated steel sheet having excellent corrosion resistance is not provided.

The surface treatment liquid (A) for a zinc-based metal coated steel sheet used in the present invention preferably contains the vanadic acid compound (e). The vanadic acid compound (e) is uniformly dispersed in a film formed on a surface of a zinc-based metal coated steel sheet in a state such that the compound dissolves easily in water, and provides what is called an inhibitor effect at the time of corrosion of zinc. Examples of the vanadic acid compound (e) include ammonium metavanadate, sodium metavanadate, and vanadium acetylacetonate. One or more of them may be used.

The proportion of the vanadic acid compound (e) is in the range of 0.03 to 0.23 and preferably 0.04 to 0.20 when expressed in the ratio of the mass ($e_V$) of the vanadic acid compound (e) in terms of V to the mass of the solid ($d_S$) of the chelating agent (d), i.e., ($e_V/d_S$). A ratio by mass of less than 0.03 does not result in a zinc-based metal coated steel sheet having excellent corrosion resistance. A ratio by mass exceeding 0.23 makes it difficult to dissolve the vanadic acid compound (e) in the surface treatment liquid.

The surface treatment liquid (A) contains the titanium compound (f). In a film formed on a surface of a zinc-based metal coated steel sheet, the titanium compound (f) is effective in imparting excellent corrosion resistance to the zinc-based metal coated steel sheet (in particular, a processed portion). Examples of the titanium compound (f) include titanyl sulfate, titanyl nitrate, titanium nitrate, titanyl chloride, titanium chloride, titania sols, titanium oxide, potassium titanate oxalate, fluorotitanic acid, ammonium fluorotitanate, titanium lactate, titanium tetraisopropoxide, titanium acetylacetonate, and diisopropyltitanium bis(acetylacetonate). Further examples thereof include metatitanic acid prepared by thermal hydrolysis of an aqueous solution of titanyl sulfate, orthotitanic acid prepared by alkali neutralization of an aqueous solution of titanyl sulfate, and salts thereof.

The proportion of the titanium compound (f) is in the range of 0.02 to 0.19 and preferably 0.03 to 0.15 when expressed in the ratio of the mass ($f_T$) of the titanium compound (f) in terms of Ti to the mass of the solid ($d_S$) of the chelating agent (d), i.e., ($f_T/d_S$). A ratio by mass of less than 0.02 does not result in a zinc-based metal coated steel sheet having excellent corrosion resistance. A ratio by mass exceeding 0.19 makes it difficult to dissolve the titanium compound (f) in the surface treatment liquid.

The surface treatment liquid (A) for a steel sheet is required to have a pH of 3 to 6 and preferably 4 to 5. A pH of the surface treatment liquid of less than 3 results in a reduction in the shelf stability (storage stability) of the surface treatment liquid and causes significant etching of zinc, thereby reducing the corrosion resistance and conductivity of a zinc-based metal coated steel sheet. A pH exceeding 6 results in a reduction in the adhesion of a film formed on a surface of a zinc-based metal coated steel sheet. In the present invention, in the case of using an alkali to adjust the pH, ammonium, amine, an amine derivative, or amino polycarboxylic acid is preferred. In the case of using an acid, one selected from chelating agents (d) described above is preferred. In particular, in the case where the pH is adjusted with an inorganic acid, for example, nitric acid, phosphoric acid, sulfuric acid, or hydrofluoric acid, the amount of the acid added is, at most, less than 4% by mass with respect to the total solid of the surface treatment liquid because of a reduction in the conductivity of a zinc-based metal coated steel sheet.

Note that, for example, a surfactant, called a wettability improver, used to form a uniform film on a surface to be coated, a thickener, a conductive material used to improve conductivity, a color pigment used to improve design, and a solvent used for improving film formability, may be appropriately added to the surface treatment liquid (A), as needed.

The surface treatment liquid (A) is prepared by mixing the foregoing components in, for example, deionized water or distilled water. The solid content of the surface treatment liquid may be appropriately selected. Furthermore, a water-soluble solvent, for example, alcohol, ketone, or cellosolve, a surfactant, an antifoaming agent, a leveling agent, antibacterial and antifungal agents, and a coloring agent may be added to the surface treatment liquid, as needed. The addition thereof improves drying properties of the surface treatment liquid, the appearance of a coating, workability, shelf stability (storage stability), and design. However, it is important to add the additives to the extent that the quality obtained in the present invention is not impaired. The amount added is, at most, less than 5% by mass with respect to the total solid of the surface treatment liquid.

(Formation of First Layer)

As described above, in the present invention, the predetermined surface treatment liquid (A) is preferably applied to a surface of a zinc-based metal coated layer of a zinc-based metal coated steel sheet and dried by heating to form the first layer. Examples of a method for applying the surface treatment liquid (A) to the zinc-based metal coated steel sheet include a roll coating method, a bar coating method, an immersion method, and a spray coating method. An optimum method is selected, depending on, for example, the shape of a zinc-based metal coated steel sheet to be treated. More specifically, for example, if a zinc-based metal coated steel sheet to be treated has a sheet shape, the surface treatment liquid is applied by a roll coating method or a bar coating method or is sprayed on a zinc-based metal coated steel sheet, and then the coating weight is adjusted with squeeze rolls or by blowing a gas thereto at high pressure. If a zinc-based metal coated steel sheet is formed into a formed article, for example, a method is selected in which the article is immersed in the surface treatment liquid and withdrawn therefrom, and in some cases, an excess of the surface treatment liquid is blown off with compressed air to adjust the coating weight.

Before applying the surface treatment liquid (A) to a zinc-based metal coated steel sheet, the zinc-based metal coated steel sheet may be subjected to a pretreatment to remove oil and dirt on a surface of a coated layer of the zinc-based metal coated steel sheet, as needed. Zinc-based metal coated steel sheets are often coated with rust preventive oil to prevent the formation of rust. Even if they are coated with rust preventive oil, oil, dirt, and so forth attached during processing are present. These applied oil, oil, and dirt inhibit the wettability of the surface of the zinc coated layer and create difficulties in forming the uniform first layer. So, the foregoing pretreatment is performed to clean the surface of the zinc-based metal coated layer, the clean surface being likely to be uniformly wetted. In the case where there is no oil or dirt on the surface of the zinc-based metal coated steel sheet and where the surface is uniformly wetted with the surface treatment liquid (A), a pretreatment step is not particularly required. Examples of a method for performing the pretreatment include, but are not particularly limited to, hot-water washing, solvent cleaning, and alkaline cleaning.

A heating temperature (maximum sheet temperature) when the surface treatment liquid (A) applied on a surface of a zinc-based metal coated layer is dried by heating is usually in the range of 60° C. to 200° C. and preferably 80° C. to 180° C. A heating temperature of 60° C. or higher does not cause a problem, such as a reduction in the corrosion resistance of the zinc-based metal coated steel sheet, because water serving as a main solvent is not left in the film. A heating temperature of 200° C. or lower does not cause the problem because the occurrence of cracking of the film is suppressed.

An appropriately optimized heating time is selected, depending on, for example, the type of zinc-based metal coated steel sheet used. The heating time is preferably in the range of 0.1 to 60 seconds and more preferably 1 to 30 seconds in view of, for example, productivity.

The first layer is preferably formed so as to have a thickness of 0.01 to 1.0 µm after drying by heating. At a thickness of 0.01 µm or more, there is no concern about lack of corrosion resistance. A thickness of 1.0 µm or less does not lead to a reduction in the conductivity of the zinc-based metal coated steel sheet. Note that the thickness is more preferably in the range of 0.05 to 0.5 µm.

The resulting first layer has excellent heat resistance, weldability, and adhesion. In the present invention, the formation of the first layer on a surface of a zinc coated layer of a zinc-based metal coated steel sheet provides a zinc-based metal coated steel sheet having desired conductivity without reducing corrosion resistance. Although the reason for this is not clear, it is speculated that the properties are attributed to the following effects.

In the present invention, the resin emulsion (a) containing the cationic urethane resin emulsion (a-1) and/or the nonionic acrylic resin emulsion (a-2), the tetraalkoxysilane (b), and the silane coupling agent (c) in the components of the first layer constitute the preferred skeleton of the film formed on a surface of a zinc-based metal coated layer of a zinc-based metal coated steel sheet. When a film containing the resin emulsion (a) that contains emulsion (a-1) and/or the nonionic acrylic resin emulsion (a-2) is once dried, the film does not dissolve in water again and serves as a barrier, thus providing the zinc-based metal coated steel sheet having excellent properties, such as corrosion resistance, adhesion of the film, and corrosion resistance after alkaline degreasing, and having excellent formability, which is a characteristic of a resin film.

It is speculated that the dense film is formed because the incorporation of the tetraalkoxysilane (b) causes a silanol group derived from the alkoxy group of the tetraalkoxysilane (b) and the cationic urethane resin and/or nonionic acrylic resin emulsion (a-2) to be three-dimensionally cross-linked. It is also speculated that the incorporation of the silane coupling agent (c) causes a cross-linking reaction with a silanol group of the tetraalkoxysilane (b), thereby increasing the bonding strength of the film.

Among the components in the first layer, the vanadic acid compound (e) and the titanium compound (f) are uniformly dispersed in the film in states such that these compounds dissolve easily in water, and provide what is called an inhibitor effect at the time of corrosion of zinc. That is, it is speculated that the vanadic acid compound (e) and the titanium compound (f) are partially ionized under a corrosive environment and passivated to inhibit the corrosion of zinc itself. In particular, it is speculated that even in the case where a zinc-based metal coated steel sheet is formed into a desired shape and where defects occur in the film at a processed portion, the titanium compound (f) is preferentially eluted in the defective portion of the film to inhibit the corrosion of zinc.

It is speculated that among the components in the first layer, the chelating agent (d) has the effects of suppressing the polymerization of the tetraalkoxysilane (b) in the surface treatment layer and stably dissolving the vanadic acid compound (e) and the titanium compound (f) in the surface treatment liquid (A). Furthermore, it is speculated that in the case where the film is formed by heating and drying, a carboxy group or phosphonate group of the chelating agent (d) serves as a cross-linking agent that is cross-linked with the skeletal components of the film to form the dense film skeleton without forming an insulating film (nonconductive film), such as zinc phosphate, thus contributing to improvement in conductivity.

That is, the first layer according to the present invention has high corrosion resistance despite the small thickness of the film composed of the cationic urethane resin emulsion and/or nonionic acrylic resin emulsion, tetraalkoxysilane, and the silane coupling agent. Furthermore, it is speculated that the incorporation of the corrosion inhibitors, i.e., the chelating agent, the vanadic acid compound, and the titanium compound, in the film makes it possible to maintain excellent conductivity even when the steel sheet is in contact with, for example, a gasket at a low pressure.

<Second Layer>

The first layer imparts satisfactory corrosion resistance to a zinc-based metal coated steel sheet. However, the first layer is a complex oxide film (inorganic film); hence, in the case where countermeasures are taken against the corrosion of a zinc-based metal coated steel sheet, the effect of the first layer is inferior to an organic resin film. In some applications, it is assumed that it is difficult to satisfy required corrosion resistance. So, in the present invention, a surface treatment liquid (B) is preferably applied to a surface of the first layer and dried by heating to form a second layer. The second layer resulting from surface treatment liquid (B) is an organic resin layer. In the present invention, the second layer plays a role in protecting the first layer and reinforcing the corrosion resistance (chemical resistance, galling resistance, fingerprint resistance, design, and so forth) of the zinc-based metal coated steel sheet.

The steel sheet is formed so as to have a thickness such that the conductivity of the zinc-based metal coated steel sheet is not impaired. Therefore, the present invention provides a practical zinc-based metal coated steel sheet which has a good balance between conductivity and corrosion resistance and which is usable as a material for, for example, a shield box.

(Surface Treatment Liquid (B))

The surface treatment liquid (B) contains an organic resin (g) as a main component. Any organic resins may be used as an organic resin (g). Examples thereof include, but are not limited to, epoxy resins, modified epoxy resins, urethane resins, alkyd resins, acrylic resins, ethylene resins (polyolefin resins), polyester resins, polybutadiene resins, amino resins, phenolic resins, fluorocarbon resins, and silicon resins. The proportion of the organic resin (g) in the surface treatment liquid (B) is in the range of about 50% to 90% by mass in terms of the solid content. In this range, the role of the second layer can be achieved.

As described above, an organic resin film is more effective in imparting corrosion resistance to a zinc-based metal coated steel sheet than a complex oxide film (inorganic film). So, in the present invention, despite the type of organic resin (g) contained in the surface treatment liquid (B), the second layer is formed in order to protect the first layer and reinforce the corrosion resistance of a zinc-based metal coated steel sheet.

Here, when an organic resin (g-1) containing an OH group and/or a COOH group or a hydrazine-modified organic resin (g-2) described below is used as the organic resin (g) contained in the surface treatment liquid (B), it is possible to further improve the film.

(Organic Resin (g-1) Containing OH Group and/or COOH Group)

In the present invention, the use of the surface treatment liquid (B) that contains the organic resin (g-1) containing an OH group and/or a COOH group results in a zinc-based metal coated steel sheet having excellent adhesion between the first layer and the second layer and having better corrosion resistance.

Examples of the organic resin (g-1) containing an OH group and/or a COOH group include (g-11) an epoxy resin, (g-12) a modified epoxy resin, (g-13) a polyhydroxy polyether resin, (g-14) a urethane resin, (g-15) an alkyd resin, (g-16) an acrylic resin, (g-17) am ethylene copolymer, (g-18) acrylic silicon resin, and (g-19) a fluorocarbon resin copolymer, which are described below.

(g-11) Epoxy Resin

Examples of the epoxy resin that may be used include an epoxy resin in which, for example, bisphenol A, bisphenol F, or novolac is formed into a glycidyl ether; an epoxy resin in which bisphenol A is subjected to addition of propylene oxide, ethylene oxide, or polyalkylene glycol to form a glycidyl ether; aliphatic epoxy resins, alicyclic epoxy resins; and polyether-based epoxy resins. In the case where the surface treatment liquid (B) containing the epoxy resin is dried by heating to form the second layer, in particular, when the film is needed to be formed in a low-temperatures range, an epoxy resin having a number-average molecular weight of 1500 or more is preferred. These epoxy resins described above may be used separately or in combination as a mixture of different types.

(g-12) Modified Epoxy Resin

Examples of the modified epoxy resin include resins prepared by allowing epoxy groups or hydroxy groups in the epoxy resins described above to react with various modifiers. Specific examples thereof include epoxy ester resins prepared by allowing epoxy groups or hydroxy groups described above to react with carboxy groups in drying oil fatty acids; epoxy acrylate resins prepared by allowing epoxy groups or hydroxy groups described above to react with acrylic acid or methacrylic acid; urethane-modified epoxy resins prepared by allowing epoxy groups or hydroxy groups described above to react with isocyanate compounds; and amine-added urethane-modified epoxy resins prepared by addition of alkanolamines to urethane-modified epoxy resins resulting from the reaction of epoxy resins with isocyanate compounds.

(g-13) Polyhydroxy Polyether Resin

The polyhydroxy polyether resin is a polymer prepared by polycondensation of a mononuclear or binuclear dihydric phenol, or a mixture of mononuclear and binuclear dihydric phenols with a substantially equimolar amount of epihalohydrin in the presence of an alkaline catalyst. Typical examples of the mononuclear dihydric phenol include resorcin, hydroquinone, and catechol. A typical example of the binuclear phenol is bisphenol A. These may be used separately or in combination or two or more.

(g-14) Urethane Resin

Examples of the urethane resin include oil-modified polyurethane resins, alkyd polyurethane resins, polyester urethane resins, polyether urethane resins, and polycarbonate polyurethane resins.

(g-15) Alkyd Resin

Examples of the alkyd resin include oil-modified alkyd resins, rosin-modified alkyd resins, phenol-modified alkyd resins, styrene-alkyd resins, silicon-modified alkyd resins, oil-free alkyd resins, and high-molecular-weight oil-free alkyd resins.

(g-16) Acrylic Resin

Examples of the acrylic resin include polyacrylic acid and copolymers thereof, polyacrylate and copolymers thereof, polymethacrylic acid and copolymers thereof, polymethacrylate and copolymers thereof, urethane-acrylic acid copolymers (or urethane-modified acrylic resins), and styrene-acrylic acid copolymers. Furthermore, resins prepared by modification of these resins with, for example, other alkyd resins, epoxy resins, and phenolic resins may be used.

(g-17) Ethylene Copolymer

Examples of the ethylene copolymer include ethylene copolymers, such as ethylene-acrylic acid copolymers, ethylene-methacrylic acid copolymers, and carboxy-modified polyolefin resins, ethylene-unsaturated carboxylic acid copolymers, ethylene ionomers.

(g-18) Acrylic Silicon Resin

An example of the acrylic silicon resin is a resin which contains an acrylic copolymer, serving as a main component, having a hydrolyzable alkoxysilyl group in its side chain or at its end, and a curing agent. The use of such an acrylic silicon resin should provide excellent weatherability.

(g-19) Fluorocarbon Resin Copolymer

Examples of the fluorocarbon resin copolymer include fluoroolefin copolymers. An example of fluoroolefin copolymers is a copolymer prepared by copolymerization of a fluorocarbon monomer (fluoroolefin) with, for example, alkyl vinyl ether, cycloalkyl vinyl ether, carboxylic acid-modified vinyl ester, hydroxyalkyl allyl ether, or tetrafluoropropyl vinyl ether, which serve as a monomer. The use of the fluorocarbon resin copolymer should provide excellent weatherability and hydrophobicity.

As the organic resin (g-1) of the present invention, thermosetting resins are preferred. Among these resins, thermosetting epoxy resins and modified epoxy resins having excellent barrier properties against corrosive factor, such as oxygen, are optimal. In the case where the second layer is formed by the use of the surface treatment liquid (B) containing the organic resin (g-1), it is possible to provide a zinc-based metal coated steel sheet having desired corrosion resistance even at a small thickness of the film. So, it is particularly advantageous when importance is attached to the conductivity and spot weldability of a zinc-based metal coated steel sheet to suppress the coating weight of the film to a low level.

From the viewpoint of corrosion resistance, formability, and paintability, among the organic resins (g-1) described above, (g-11) the epoxy resin, (g-12) a modified epoxy resin, and (g-17) an ethylene copolymer are preferred. In particular, thermosetting epoxy resins and modified epoxy resins having excellent barrier properties against corrosive factor, such as oxygen, are particularly preferred. Examples of these thermosetting resins include thermosetting epoxy resins, thermosetting modified epoxy resins, acrylic copolymer resins copolymerized with epoxy group-containing monomers, epoxy group-containing polybutadiene resins, epoxy group-containing polyurethane resins, and adducts and condensates of these resin. These epoxy group-containing resins may be used separately or in combination as a mixture of two or more.

In addition to (g-11) to (g-19), for example, a polybutadiene resin, a phenolic resin, a polyamine resin, or polyphenylene resin may be used as the organic resin (g) of the present invention. Furthermore, a mixture of two or more or an addition polymer of these resins described above may be used.

A core-shell water-dispersible resin in which the core and the shell of each particle of the resin are composed of different resin components or resin components having different glass transition temperatures may be used in order to reduce the heat-drying temperature of the resin.

A water-dispersible resin having self-crosslinking properties, for example, containing alkoxysilane groups may be used. In this case, it is possible to use interparticle crosslinking by means of the formation of silanol groups by the hydrolysis of alkoxysilane and a dehydration condensation reaction of the silanol groups between resin particles during the drying of the resin by heating.

Furthermore, organic composite silicate in which an organic resin is combined with silica using a silane coupling agent is preferred as the organic resin (g) of the present invention.

As described above, for the purpose of improving the corrosion resistance and formability of the second layer, in particular, a thermosetting resin is preferably used as the organic resin (g-1). In this case, an amino resin, e.g., a urea resin (for example, butylated urea resin), a melamine resin (butylated melamine resin), a butylated urea-melamine resin, or a benzoguanamine resin, and a curing agent, e.g., a blocked isocyanate, an oxazoline compound, or a phenolic resin, may be incorporated in the organic resin (g-1).

The formation of the second layer from surface treatment liquid (B) containing the organic resin (g-1) described above results in improvement in adhesion between the first layer and the second layer, thereby providing a zinc-based metal coated steel sheet having better corrosion resistance. Although the reason the effects are provided is not clear, it is speculated that the organic resin (g-1) containing an OH group and/or a COOH group (preferably a thermosetting resin and more preferably an epoxy resin and/or a modified epoxy resin) is reacted with a curing agent (cross-linking agent) to form a dense barrier film having the excellent ability to inhibit permeation of a corrosive factor, such as oxygen. It is also speculated that the barrier film contributes significantly to improvement in adhesion between the first layer and the second layer because an OH group or a COOH group in its molecule is tightly bonded to an alkoxysilane or an epoxy group-containing compound in the first layer.

(Hydrazine-Modified Organic Resin (G-2))

In the present invention, the use of the surface treatment liquid (B) containing the hydrazine-modified organic resin (g-2) prepared by reaction with an active hydrogen-containing compound (i) composed of a hydrazine derivative (h) in which some or all of compounds contain active hydrogen makes it possible to provide a zinc-based metal coated steel sheet having significantly satisfactory corrosion resistance while a reduction in conductivity is minimized.

The hydrazine-modified organic resin (g-2) is formed by the reaction of a predetermined organic resin (C) and the active hydrogen-containing compound (i) composed of the hydrazine derivative (h) in which some or all of compounds contain active hydrogen. Any resin may be used as the organic resin (C) without particular limitation as long as it can react with the active hydrogen-containing compound (i) composed of the hydrazine derivative (h) to establish a bond between the organic resin and the active hydrogen-containing compound (i) by addition or condensation reaction and as long as it appropriately forms a film. Examples of the organic resin (C) include epoxy resins, modified epoxy resins, polyurethane resins, polyester resins, alkyd resins, acrylic copolymer resins, polybutadiene resins, phenolic resins, and adducts and condensates of these resins. These resins may be used separately or in combination as a mixture of two or more.

As the organic resin (C), an epoxy group-containing resin (C1) that contains an epoxy group in the resin is particularly preferred in view of, for example, reactivity, ease of reaction, and corrosion resistance. Examples of the epoxy group-containing resin (C1) include an epoxy resin (C1-1), a modified epoxy resin (C1-2), an acrylic copolymer resin (C1-3) prepared by, for example, copolymerization with an epoxy group-containing monomer, epoxy group-containing polybutadiene resins, epoxy group-containing polyurethane resins, and adducts and condensates of these resins. These epoxy group-containing resins may be used separately or in combination as a mixture or two or more.

Among these resins serving as the epoxy group-containing resin (C1), the epoxy resin (C1-1) and the modified epoxy resin (C1-2) are particularly preferred in view of adhesion to a surface of the first layer (composite oxide film) and corrosion resistance. Among these resins, thermosetting epoxy resins and modified epoxy resins, which have excellent barrier properties against a corrosive factor, such as oxygen, are optimal. The second layer is formed by use of the surface treatment liquid (B) containing the hydrazine-modified organic resin (g-2) prepared by reaction of the epoxy group-containing resin (C1) described above and the active hydrogen-containing compound (i) composed of the hydrazine derivative (h) in which some or all of compounds contain active hydrogen, thereby providing a zinc-based metal coated steel sheet having significantly satisfactory corrosion resistance even at a small thickness of the film. So, it is particularly advantageous when importance is attached to the conductivity and spot weldability of a zinc-based metal coated steel sheet to suppress the coating weight of the film to a low level.

Examples of the epoxy resin (C1-1) include aromatic epoxy resins prepared by reaction of polyphenol, such as bisphenol A, bisphenol F, and novolac phenols, with epihalohydrin, such as epichlorohydrin, to introduce glycidyl groups, or reaction of the resulting glycidyl group-containing products with polyphenols to increase the molecular weight; aliphatic epoxy resins; and alicyclic epoxy resins. These resins may be used separately or in combination as a mixture of two or more. In the case where the surface treatment liquid (B) containing the hydrazine-modified organic resin (g-2) prepared by reaction of the epoxy resin (C1-1) and the active hydrogen-containing compound (i) composed of the hydrazine derivative (h) in which some or all of compounds contain active hydrogen, is dried by heating to form the second layer, in particular, when the film needs to be formed at a low temperature, the epoxy resin (C1-1) having a number-average molecular weight of 1500 or more is preferred.

A resin having a chemical structure represented by formula (1) and being prepared by a reaction product of bisphenol A and epihalohydrin is particularly preferred as the epoxy resin (C1-1) described above. The epoxy resin is particularly preferred because of its excellent corrosion resistance.

[Chem. 1]

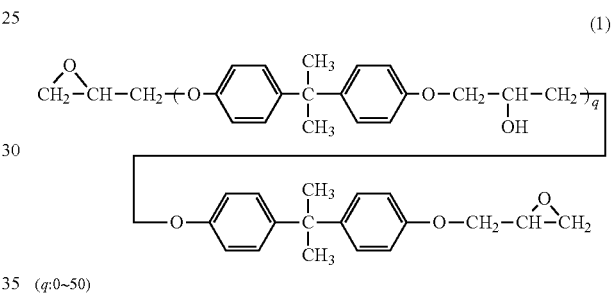

($q$:0~50)

A method for producing such a bisphenol A-type epoxy resin is widely known in the art. In the chemical structure, q represents 0 to 50, preferably 1 to 40, and more preferably 2 to 20.

Examples of the modified epoxy resin (C1-2) described above include resins prepared by prepared by allowing epoxy groups or hydroxy groups in the epoxy resin (C1-1) described above to react with various modifiers. Specific examples thereof include epoxy ester resins prepared by reaction with drying oil fatty acids; epoxy acrylate resins prepared by modification with polymerizable unsaturated monomer components containing, for example, acrylic acid or methacrylic acid; and urethane-modified epoxy resins prepared by reaction with isocyanate compounds.

An example of the acrylic copolymer resin (C1-3) prepared by copolymerization with the epoxy group-containing monomer is a resin prepared by, for example, aqueous polymerization, emulsion polymerization, or suspension polymerization of an epoxy group-containing unsaturated monomer and a polymerizable unsaturated monomer component essentially containing acrylate or methacrylate.

Examples of the polymerizable unsaturated monomer component include C1 to C24 alkyl esters of acrylic acid and methacrylic acid, such as methyl (meth)acrylate, ethyl (meth)acrylate, propyl (meth)acrylate, n-, iso-, and tert-butyl (meth)acrylate, hexyl (meth)acrylate, 2-ethylhexyl (meth)acrylate, decyl (meth)acrylate, and lauryl (meth)acrylate; C1 to C4 alkyl ether compounds of acrylic acid, methacrylic acid, styrene, vinyltoluene, acrylamide, acrylonitrile, N-methylol (meth)acrylamide; and N,N-diethylaminoethyl methacrylate.

Any monomer containing an epoxy group and a polymerizable unsaturated group, for example, glycidyl methacrylate, glycidyl acrylate, or 3,4-epoxycyclohexylmethyl (meth)acrylate may be used as the epoxy group-containing unsaturated monomer without particular limitation.

Furthermore, the acrylic copolymer resin (C1-3) prepared by copolymerization with the epoxy group-containing monomer may be a resin modified with, for example, a polyester resin, an epoxy resin, or a phenolic resin.

The organic resin (C) may be soluble in an organic solvent, dispersible in an organic solvent, soluble in water, or dispersible in water.

The hydrazine-modified organic resin (g-2) of the present invention aims to incorporate the hydrazine derivative (h) into the molecule of the organic resin (C) described above. So, at least part (preferably, the whole) of the active hydrogen-containing compound (i) needs to be the hydrazine derivative (h) containing active hydrogen.

In the case where the organic resin (C) is the epoxy group-containing resin (C1), the following compounds may be exemplified as the active hydrogen-containing compound (i) that reacts with the epoxy group. One or two or more of these compounds may be used. Also in this case, at least part (preferably, the whole) of the active hydrogen-containing compound (i) needs to be the hydrazine derivative (h) containing active hydrogen.

a hydrazine derivative (i1) containing active hydrogen
    a primary or secondary amine compound (i2) containing active hydrogen
    ammonia and organic acid (i3), such as carboxylic acid
    hydrogen halide (i4), such as hydrogen chloride
    alcohol and thiol (i5)
    an active hydrogen-free hydrazine derivative, and a quaternary chlorinating agent (i6) that is a mixture of a tertiary amine and an acid Examples of the hydrazine derivative (h) containing active hydrogen include:
(1) hydrazide compounds, such as carbohydrazide, propionic acid hydrazide, salicylic acid hydrazide, adipic acid dihydrazide, sebacic acid dihydrazide, dodecanedioic acid dihydrazide, isophthalic acid dihydrazide, thiocarbohydrazide, 4,4'-oxybisbenzenesulfonylhydrazide, benzophenonehydrazone, and N-aminopolyacrylamide;
(2) pyrazole compounds, such as pyrazole, 3,5-dimethylpyrazole, 3-methyl-5-pyrazolone, and 3-amino-5-methylpyrazole;
(3) triazole compounds, such as 1,2,4-triazole, 3-amino-1,2,4-triazole, 4-amino-1,2,4-triazole, 3-mercapto-1,2,4-triazole, 3-amino-5-mercapto-1,2,4-triazole, 2,3-dihydro-3-oxo-1,2,4-triazole, 1H-benzotriazole, 1-hydroxybenzotriazole (monohydrate), 6-methyl-8-hydroxytriazolopyridazine, 6-phenyl-8-hydroxytriazolopyridazine, and 5-hydroxy-7-methyl-1,3,8-triazaindolizine;
(4) tetrazole compounds, such as 5-phenyl-1,2,3,4-tetrazol and 5-mercapto-1-phenyl-1,2,3,4-tetrazol;
(5) thiadiazole compounds, such as 2-amino-5-mercapto-1,3,4-thiadiazole and 2,5-dimercapto-1,3,4-thiadiazole; and
(6) pyridazine compounds, such as maleic acid hydrazide, 6-methyl-3-pyridazone, 4,5-dichloro-3-pyridazone, 4,5-dibromo-3-pyridazone, and 6-methyl-4,5-dihydro-3-pyridazone.

Among these compounds, pyrazole compounds and triazole compounds each having a five- or six-membered ring structure and containing a nitrogen atom in its ring structure are particularly preferred.

These hydrazine derivatives (h) may be used separately or in combination as a mixture of two or more.

Typical examples of the active hydrogen-containing amine compound (i2) that may be used as part of the active hydrogen-containing compound (i) include:
(1) compounds of aldimine, ketimine, oxazoline, or imidazoline prepared by reaction of a primary amino group of an amine compound containing one secondary amino group and one or more primary amino groups, for example, diethylenetriamine, hydroxyethylaminoethylamine, ethylaminoethylamine, or methylaminopropylamine, with ketone, aldehyde, or carboxylic acid at, for example, about 100° C. to about 230° C.;
(2) secondary monoamines, such as diethylamine, diethanolamine, di-n- or di-1-propanolamine, N-methylethanolamine, and N-ethylethanolamine;
(3) secondary amine-containing compounds prepared by Michael addition reaction of monoalkanolamine, such as monoethanolamine, and dialkyl(meth)acrylamide; and
(4) compounds prepared by modifying a primary amino group of alkanolamine, for example, monoethanolamine, neopentanolamine, 2-aminopropanol, 3-aminopropanol, or 2-hydroxy-2'(aminopropoxy)ethyl ether into ketimine.

Examples of the organic acid (i3) that may be used as part of the active hydrogen-containing compound (i) include formic acid, acetic acid, propionic acid, butyric acid, caproic acid, lauric acid, palmitic acid, stearic acid, oleic acid, linolenic acid, oxalic acid, malonic acid, succinic acid, glutaric acid, benzoic acid, phthalic acid, gallic acid, terephthalic acid, isophthalic acid, salicylic acid, lactic acid, citric acid, maleic acid, and adipic acid.

Examples of the hydrogen halide (i4) that may be used as part of the active hydrogen-containing compound (i) include hydrogen fluoride, hydrogen bromide, and hydrogen iodide.

Examples of the alcohol and thiol (i5) that may be used as part of the active hydrogen-containing compound (i) include methanol, ethanol, propanol, propan-2-ol, butanol, phenylmethanol, propane-1,2-diol, ethanethiol, butane-2,3-dithiol, and 3-mercapto-2-butanol.

The quaternary chlorinating agent (i6) that may be used as part of the active hydrogen-containing compound (i) is composed of a mixture of an acid and an active hydrogen-free hydrazine derivative or a tertiary amine in order to permit the active hydrogen-free hydrazine derivative or the tertiary amine, which does not have reactivity to an epoxy group, to react with an epoxy group. The quaternary chlorinating agent reacts with an epoxy group in the presence of water to form an epoxy group-containing organic resin and a quaternary salt, as needed. As the acid used to prepare the quaternary chlorinating agent, any of acids, such as organic acids, e.g., acetic acid and lactic acid, and inorganic acids, e.g., hydrochloric acid, may be used. An example of the active hydrogen-free hydrazine derivative used to prepare the quaternary chlorinating agent is 3,6-dichloropyridazine. Examples of the tertiary amine include dimethylethanolamine, triethylamine, trimethylamine, triisopropylamine, and methyldiethanolamine.

The hydrazine-modified organic resin (g-2) prepared by reaction of the organic resin (C) and the active hydrogen-containing compound (i) composed of the hydrazine derivative (h) in which some or all of compounds contain active hydrogen is formed by reaction of the organic resin (C) and the active hydrogen-containing compound (i) at 10° C. to 300° C. and preferably 50° C. to 150° C. for about 1 to about 8 hours. The reaction may be performed after addition of an organic solvent. The type of organic solvent used is not particularly limited. Examples thereof include ketones, such as acetone, methyl ethyl ketone, methyl isobutyl ketone, dibutyl ketone, and cyclohexanone; alcohols and ethers containing hydroxy groups, such as ethanol, butanol, 2-ethylhexyl alcohol, benzyl alcohol, ethylene glycol, ethylene glycol monoisopropyl ether, ethylene glycol mono-n-butyl ether, ethylene glycol monohexyl ether, propylene glycol, propylene glycol monomethyl ether, diethylene glycol, diethylene glycol monoethyl ether, and diethylene glycol mono-n-butyl ether; esters, such as ethyl acetate, butyl acetate, and ethylene glycol mono-n-butyl ether acetate; and aromatic hydrocarbons, such as toluene and xylene. One or two or more of these compounds may be used. Among these compounds, a ketone or ether solvent is particularly preferred in view of solubility in an epoxy resin and film formability.

The proportion of the active hydrogen-containing compound (i) composed of the hydrazine derivative (h) in which some or all of compounds contain active hydrogen is in the range of 0.5 to 20 parts by mass and particularly preferably 1.0 to 10 parts by mass with respect to 100 parts by mass of the organic resin (C) in terms of the solid content. In the case where the organic resin (C) is the epoxy group-containing resin (C1), with respect to the mixing ratio of the epoxy group-containing resin (C1) to the active hydrogen-containing compound (i), the ratio of the number of active hydrogen groups of the active hydrogen-containing compound (i) to the number of epoxy groups of the epoxy group-containing resin (C1), i.e., [number of active hydrogen groups/number of epoxy groups], is appropriately set in the range of 0.01 to 10, more preferably 0.1 to 8, and still more preferably 0.2 to 4 in view of corrosion resistance.

The proportion of the hydrazine derivative (h) containing in the active hydrogen-containing compound (i) is preferably in the range of 10% to 100% by mole, more preferably 30% to 100% by mole, and still more preferably 40% to 100% by mole. A proportion of the hydrazine derivative (h) containing active hydrogen of less than 10% by mole fails to impart sufficient anticorrosive properties to the second layer (organic resin film). So, the resulting rust-inhibiting effect is not much different from that in the case where a simple mixture of a film-forming organic resin and a hydrazine derivative is used.

The possible anticorrosion mechanism of the second layer (organic resin film) described above is as follows.

That is, the hydrazine derivative (h) containing active hydrogen is added to the organic resin (C), so that a hydrazine derivative is incorporated into a molecule of the organic resin (C).

(1) The dense organic resin film (second layer) is formed and provides the effect of blocking corrosive factors, such as oxygen and chlorine ions.

(2) The hydrazine derivative (h) is tightly bonded to a surface of the first layer to form a passivation layer.

(3) The free hydrazine derivative group (h) in the second layer traps zinc ions eluted by a corrosion reaction to form a stable insoluble chelate compound layer, thereby inhibiting the formation of an ion-conducting layer at the interface between the first layer and the zinc coated layer to inhibit the progress of corrosion.

It is believed that the progress of corrosion is effectively inhibited by the foregoing advantageous effects, thereby providing excellent corrosion resistance.

In particular, in the case where the epoxy group-containing resin (C1) is used as the organic resin (C), the reaction of the epoxy group-containing resin (C1) and a curing agent (crosslinking agent) results in the formation of a dense barrier film. The barrier film has the excellent ability to inhibit permeation of a corrosive factor, such as oxygen. Furthermore, owing to a hydroxy group in its molecule, excellent bonding strength to the first layer is obtained, thereby providing quite excellent corrosion resistance (barrier properties). Moreover, in particular, the use of an active hydrogen-containing pyrazole compound and/or an active hydrogen-containing triazole compound as the hydrazine derivative (h) containing active hydrogen results in better corrosion resistance (barrier properties).

A method in which a mixture of a film-forming organic resin and a hydrazine derivative is used has been known in the related art. Like this related art, the simple mixing of the film-forming organic resin with the hydrazine derivative provides little improvement in corrosion-inhibiting effect. The reason for this is that in the related art, the hydrazine derivative is not incorporated in the molecule of the film-forming organic resin. It is speculated that although the hydrazine derivative that is not incorporated in the molecule of the film-forming organic resin forms a chelate compound together with a metal in the first layer, the chelate compound is not formed into a dense barrier layer because of its low molecular weight. In contrast, in the present invention, the incorporation of the hydrazine derivative into the molecule of the film-forming organic resin provides the quite excellent corrosion-inhibiting effect. Thus, even if the thickness of the second layer, which is an organic resin film, is reduced in order to ensure the conductivity of a zinc-based metal coated steel sheet, the second layer that is formed by use of the surface treatment liquid (B) containing the hydrazine-modified organic resin (g-2) makes it possible to impart desired corrosion resistance to the zinc-based metal coated steel sheet.

In the present invention, the surface treatment liquid (B) containing the organic resin (g) may further contain a rust preventive additive (j).

(Rust Preventive Additive (j))

As described above, the formation of the second layer using the surface treatment liquid (B) of the present invention provides a zinc-based metal coated steel sheet having significantly satisfactory corrosion resistance. In order to further inhibit the occurrence of rust and enhance the corrosion resistance of the zinc-based metal coated steel sheet, it is effective to add the rust preventive additive (j). The rust preventive additive (j) content of the surface treatment liquid (B) is preferably in the range of about 20% to about 30% by mass in terms of the solid content.

The type of rust preventive additive (j) is not particularly limited. Any of rust preventive additives, such as known rust preventives, sufficiently provides the foregoing effect. At least one of the following compounds (k) and (l), which are self-repairing materials, is particularly preferably used:

(k) Ca ion-exchanged silica; and
(l) silicon oxide.

The Ca ion-exchanged silica used as the component (k) is a porous silica gel powder containing calcium ions fixed to surfaces of particles of the powder. The Ca ion-exchanged silica releases Ca ions in a corrosive environment to form a precipitate film, thereby providing the rust preventive effect.

Any desired Ca ion-exchange silica may be used. The Ca ion-exchanged silica has an average particle size of 6 μm or less and more preferably 4 μm or less. For example, the Ca ion-exchanged silica having an average particle size of 2 to 4 μm may be preferably used. An average particle size of Ca ion-exchanged silica exceeding 6 μm can result in reductions in corrosion resistance and dispersion stability in the surface treatment liquid (B).

The Ca ion-exchanged silica preferably has a Ca concentration of 1% by mass or more and more preferably 2% to 8% by mass. A Ca concentration of less than 1% by mass can result in an insufficient rust preventive effect owing to the release of Ca. The surface area, pH, and oil absorption of the Ca ion-exchanged silica are not particularly limited.

Examples of the Ca ion-exchanged silica that may be used include SHIELDEX C303 (average particle size: 2.5 to 3.5 µm, Ca concentration: 3% by mass), SHIELDEX AC3 (average particle size: 2.3 to 3.1 µm, Ca concentration: 6% by mass), and SHIELDEX AC5 (average particle size: 3.8 to 5.2 µm, Ca concentration: 6% by mass) (trade names, manufactured by W. R. Grace & Co.); and SHIELDEX (average particle size: 3 mm, Ca concentration: 6% to 8% by mass) and SHIELDEX SY710 (average particle size: 2.2 to 2.5 µm, Ca concentration: 6.6% to 7.5% by mass) (trade names, manufactured by Fuji Silysia Chemical Ltd).

The silicon oxide used as the component (l) may be either colloidal silica or dry-process silica. In the case where a water-based film-forming resin is used as a base, Examples of the colloidal silica that may be used include Snowtex O, Snowtex N, Snowtex 20, Snowtex 30, Snowtex 40, Snowtex C, and Snowtex S (trade names, manufactured by Nissan Chemical Industries Ltd.); Cataloid S, Cataloid SI-350, Cataloid SI-40, Cataloid SA, and Cataloid SN (trade names, manufactured by Catalyst & Chemicals Co., Ltd.); and Aderite AT-20 to 50, Aderite AT-20N, Aderite AT-300, Aderite AT-330S, and Aderite AT20Q (trade names, manufactured by Asahi Denka Co. Ltd).

In the case where a solvent-based film-forming resin is used as a base, examples of the colloidal silica that may be used include Organosilica Sol MA-ST-MS, Organosilica Sol IPA-ST, Organosilica Sol EG-ST, Organosilica Sol IPA-ST-ZL, Organosilica Sol NPC-ST-30, Organosilica Sol DMAC-ST, Organosilica Sol MEK-ST-L, Organosilica Sol XBA-ST, and Organosilica Sol MIBK-ST (trade names, manufactured by Nissan Chemical Industries Ltd.); and OSCAL-1132, OSCAL-1232, OSCAL-1332, OSCAL-1432, OSCAL-1532, OSCAL-1632, and OSCAL-1722 (trade names, manufactured by Catalyst & Chemicals Co., Ltd).

In particular, an organic solvent-dispersible silica sol has excellent dispersibility and excellent corrosion resistance in comparison with fumed silica.

Examples of the fumed silica include that may be used include AEROSIL R812, AEROSIL R974, AEROSIL R202, AEROSIL R805, AEROSIL 130, AEROSIL 200, and AEROSIL 300 (trade names, manufactured by Nihon Aerosil Co., Ltd).

It is believed that fine-particle silica as described above contributes to the formation of a dense, stable corrosion product of zinc in a corrosive environment and that the formation of the dense corrosion product on a coated surface inhibits the acceleration of corrosion.

The fine-particle silica preferably has a particle size of 5 to 50 nm, more preferably 5 to 20 nm, and still more preferably 5 to 15 nm in view of corrosion resistance.

Even in the case where one or more of the following self-repairing materials are used as the rust preventive additive (j) in addition to the components (k) and (l), the same effect as that of the components (k) and (l) is provided:
(n) phosphate;
(o) molybdate; and
(p) one or more organic compounds selected from triazoles, thiols, thiadiazoles, thiazole, and thiurams.

The phosphate used as component (n) includes all types of salts including, for example, simple salts and double salts. Metal cations contained the salts are not limited. Any metal cation of, for example, zinc phosphate, magnesium phosphate, calcium phosphate, and aluminum phosphate, may be used. The skeleton and the degree of condensation of the phosphate ion are not limited. Any one of normal salts, dihydrogen salts, monohydrogen salts, and phosphite may be used. The normal salts include orthophosphates and all condensed phosphates, such as polyphosphates.

Furthermore, the combined addition of the phosphate serving as component (n) together with a calcium compound further improves the corrosion resistance. The calcium compound may be any one of calcium oxide, calcium hydroxide, and a calcium salt. One or two or more of these compounds may be used. Examples of the calcium salt that may be used include, but are not particularly limited to, normal salts, such as calcium silicate, calcium carbonate, and calcium phosphate, each containing only calcium as a cation; and double salts, such as calcium-zinc phosphate and calcium-magnesium phosphate, each containing calcium and a cation other than calcium.

The skeleton and the degree of condensation of the molybdate used as the component (o) are not limited. Examples of the molybdate include orthomolybdates, paramolybdates, and metamolybdates. The molybdate includes all salts, such as normal salts and double salts. Examples of the double salts include phosphomolybdates.

Examples of the organic compound used as the component (p) include triazoles, such as 1,2,4-triazole, 3-amino-1,2,4-triazole, 3-mercapto-1,2,4-triazole, 5-amino-3-mercapto-1,2,4-triazole, and 1H-benzotriazole; thiols, such as 1,3,5-triazine-2,4,6-trithiol, and 2-mercaptobenzimidazole; thiadiazoles, such as 5-amino-2-mercapto-1,3,4-thiadiazole, and 2,5-dimercapto-1,3,4-thiadiazole; thiazoles, such as 2-N,N-diethylthiobenzothiazole and 2-mercaptobenzothiazole; and thiurams, such as tetraethylthiuram disulfide.

The total amount of the rust preventive additive (j) (the total amount of one or more of the self-repairing materials selected from the components (k), (l), and (n) to (p)) in the second layer is preferably in the range of 1 to 100 parts by mass (solid content), more preferably 5 to 80 parts by mass (solid content), and still more preferably 10 to 50 parts by mass (solid content) with respect to 100 parts by mass (solid content) of the organic resin in the surface treatment liquid (B). An amount of the rust preventive additive (j) added of less than 1 part by mass or more than 100 parts by mass can result in a reduction in corrosion resistance, which is not preferred.

In the present invention, the incorporation of appropriate amounts of the self-repairing materials (n) to (p) serving as the rust preventive additive (j) in the second layer provides quite excellent corrosion resistance (self-repairing effect). The possible anticorrosion mechanism of the second layer containing the rust preventive additive (j) is as follows.

In the case where the component (k), which is the rust preventive additive (j), is incorporated in the second layer, when cations, such as Na ions, enters the second layer in a corrosive environment, Ca ions on silica surfaces are released by an ion exchange function. Furthermore, OH ions are formed by cathodic reaction in a corrosive environment to increase the pH in the vicinity of an interface of the coated layer. So, the Ca ions released from the Ca ion-exchanged silica are precipitated in the form of $Ca(OH)_2$ in the vicinity of the interface of the coated layer. The resulting dense, sparingly soluble product seals defects, thereby inhibiting a corrosion reaction. Moreover, it is believed that the eluted zinc ions are exchanged for the Ca ions and fixed to the silica surfaces.

The component (l) contributes to the formation of a dense, stable corrosion product of zinc in a corrosive environment. The corrosion product is densely formed on the surface of the coated layer, thereby inhibiting the acceleration of corrosion.

The component (n) is dissociated into phosphate ions by hydrolysis in a corrosive environment and is subjected to a complexation reaction with the eluted metal to form a protective film.

The component (o) provides the self-repairing properties on the basis of a passivation effect. That is, the component forms a dense oxide on the surface of the coated film together with dissolved oxygen in a corrosive environment, thereby sealing the origin of corrosion to inhibit a corrosion reaction.

The component (p) provides the self-repairing properties on the basis of an adsorption effect. That is, eluted zinc and aluminum due to corrosion are adsorbed to a nitrogen- or sulfur-containing polar group in the component (p) to form an inert film, thereby sealing the origin of corrosion to inhibit a corrosion reaction.

In the present invention, even if the components (k) and (l), or components (n) to (p) in addition thereto are incorporated in a general organic film, the rust preventive effect is provided to some extent. In the case where the self-repairing materials, i.e., the components (k) and (l), or components (n) to (p) in addition thereto, are incorporated in the second layer having excellent barrier properties and containing a specific organic resin (organic resin (g-1) containing an OH group and/or a COOH group, or the hydrazine-modified organic resin (g-2)), both effects (barrier effect and self-repairing effect) may be combined to provide the outstanding rust preventive effect.

In the case where a calcium compound is added in combination with the component (n), the calcium compound is eluted in a corrosive environment before the elution of a coating metal, and thus is subjected to a complexation reaction with phosphate ions to form a dense, sparingly soluble protective film without using the elution of the coating metal as a trigger, thereby inhibiting a corrosion reaction.

The combined addition of two or more of the components (k) and (l) or components (n) to (p) in addition thereto results in the combination of the corrosion-inhibiting effects of the components, thereby providing better corrosion resistance.

In addition to the rust preventive additives, the organic film may further contain one or two or more of other oxide fine particles, phosphomolybdates, organic phosphoric acids and salts thereof, and organic inhibitors, which serve as a corrosion inhibitors.

(Lubricant (m))

In the present invention, the surface treatment liquid (B) may further contain a lubricant (m) in order to improve the formability of the film, as needed. Examples of the lubricant (m) that may be used are described below. One or two or more of these compounds may be used.

(m1) Polyolefin wax and paraffin wax, e.g., polyethylene wax (m1-1), synthetic paraffin, natural paraffin, microcrystalline wax, and chlorinated hydrocarbons; (m2) fine particles of fluorocarbon resins, e.g., polyfluoroethylene resins (polytetrafluoroethylene resins), polyvinyl fluoride resins, and polyvinylidene fluoride resins.

Other examples thereof include fatty acid amide compounds (for example, stearic amide, stearamide, palmitamide, methylenebisstearamide, ethylenebisstearamide, oleamide, erucamide, and alkylenebisfatty acid amide); metallic soaps (for example, calcium stearate, lead stearate, calcium laurate, and calcium palmitate); metallic sulfides (for example, molybdenum disulfide and tungsten disulfide); graphite; graphite fluoride; boron nitride; polyalkylene glycol; and alkali metal sulfates. One or two or more of these compounds may be used.

Among these lubricants, the polyethylene wax (m1) and fluorocarbon resins fine particles (m2) (in particular, polytetrafluoroethylene resin fine particles) are particularly preferred.

Examples of the polyethylene wax (m1) include Ceridust 9615A, Ceridust 3715, Ceridust 3620, and Ceridust 3910 (trade names, manufactured by Clariant (Japan) K.K.); Sanwax 131-P and Sanwax 161-P (trade names, manufactured by Sanyo Chemical Industries, Ltd.; and Chemipearl W-100, Chemipearl W-200, Chemipearl W-500, Chemipearl W-800, and Chemipearl W-950 (trade names, manufactured by Mitsui Petrochemical Industries, Ltd).

As the fluorocarbon resin fine particles (m2), tetrafluoroethylene fine particles are most preferred. Preferred examples thereof include Lubron L-2 and Lubron L-5 (trade names, manufactured by Daikin Industries, Ltd.; MP1100 and MP1200 (trade names, manufactured by Mitsui-Dupont Co., Ltd.; and Fluon Dispersion AD1, Fluon Dispersion AD2, Fluon L141J, Fluon L150J, and Fluon L155J (trade names, manufactured by Asahi ICI Fluoropolymers Co., Ltd).

Among these compounds, combinations of the polyolefin wax and the tetrafluoroethylene fine particles should provide a quite excellent lubricating effect.

The amount of the lubricant (m) in the second layer is preferably in the range of 1 to 80 parts by mass (solid content) and more preferably 3 to 40 parts by mass (solid content) with respect to 100 parts by mass (solid content) of the organic resin in the surface treatment liquid (B). An amount of the lubricant (m) of 1 part by mass or more results in a sufficient lubricating effect. An amount of 80 parts by mass or less does not cause a reduction in paintability.

In the present invention, a curing agent may be added to the surface treatment liquid (B) in order to form the second layer serving as a dense barrier film. So, the second layer may be formed by thermal curing.

As a curing method for forming the second layer serving as a dense barrier film, the following methods are appropriate:
(1) a curing method that uses a urethane-forming reaction between an isocyanate and a hydroxy group of a base resin; and
(2) a curing method that uses an etherification reaction between an alkyl-etherified amino resin and a hydroxy group of a base resin (the alkyl-etherified amino resin is prepared by partially or entirely reacting a methylol compound, which is prepared by reaction of one or more compounds selected from melamine, urea, and benzoguanamine with formaldehyde, with a monohydric alcohol having 1 to 5 carbon atoms).
It is particularly preferable to use the urethane-forming reaction between an isocyanate and a hydroxy group of a base resin as a main reaction.

In the present invention, the surface treatment liquid (B) may further contain one or two or more of organic color pigments (for example, fused polycyclic organic pigments and phthalocyanine organic pigments), color dyes (for example, organic solvent-soluble azo dyes and water-soluble azo metal dyes), inorganic pigments (for example, titanium oxide), chelating agents (for example, thiols), conductive pigments (for example, powders of metals, such as zinc, aluminum, and nickel, iron phosphide, and antimony-doped tin oxide), coupling agents (for example, silane coupling agents and titanium coupling agents), and melamine-cyanuric acid adducts, as needed.

(Another Organic Resin)

As described above, the use of the surface treatment liquid (B) which contains the organic resin (g-1) containing an OH group and/or a COOH group, or which contains the hydrazine-modified organic resin (g-2) results in a zinc-based metal coated steel sheet having excellent adhesion and conductivity. For example, when importance is attached to the formability of a zinc-based metal coated steel sheet, the surface treatment liquid (B) containing a water-soluble urethane-modified acrylic resin and/or a water-dispersible urethane-modified acrylic resin (q) serving as the organic resin (g), the curing agent (r), the silicon oxide (l), and the lubricant (m) in a specific ratio is preferably used.

The water-soluble urethane-modified acrylic resin (q) may be a water-soluble resin, a water-dispersible resin, or a mixture of these resins. A method for modifying an acrylic resin with urethane is not particularly limited. For the water-soluble or water-dispersible urethane-modified acrylic resin (q), the solid content by mass of a urethane component in the solid resin is preferably in the range of 10% to 50% by mass and more preferably 10% to 30% by mass.

Curing agent (r) is added in order to form sufficient cross-links in the film. The cross-links provide excellent corrosion resistance and solvent resistance. The type of curing agent is not particularly limited. A compound containing at least one functional group selected from an epoxy group, an oxazoline group, an isocyanate group, and an aziridinyl group, which are not hydrophilic groups, is particularly preferably used rather than, for example, amine, polyhydric alcohol, and polybasic acid containing amino groups, hydroxy groups, and carboxy groups, which are hydrophilic groups.

The silicon oxide (l) is added in order to improve corrosion resistance. The type of silicon oxide (l) is not particularly limited. One or more of, for example, colloidal silica and fumed silica described above may be used. In the present invention, the particle size and type of silica are not particularly limited.

The lubricant (m) serves as a lubricating component to improve scratch resistance. Examples of the lubricant (m) that may be used include, but are not particularly limited to, carnauba wax, rice wax, lanolin wax, montan wax, paraffin wax, microcrystalline wax, fatty ester wax, fatty acid amide wax and partially saponified products thereof, polyethylene wax, polyolefin wax, chlorinated hydrocarbons, fluorinated hydrocarbons, and ethylene-acrylic copolymer wax. One or two or more of these compounds may be used. The lubricant (m) preferably has an average particle size of 0.05 to 3.0 μm. The lubricant (m) preferably has a melting point of 50° C. to 160° C. The shape of the lubricant particles is preferably spherical in order to achieve a high degree of formability.

The proportion of the total mass of the solids of (q) and (r) is preferably in the range of 50% to 95% by mass and more preferably 55% to 75% by mass with respect to the total mass of the solids of the water-soluble urethane-modified acrylic resin and/or water-dispersible urethane-modified acrylic resin (q)+ the curing agent (r)+ the silicon oxide (l)+ the lubricant (m) (hereinafter, referred to as "(q)+(r)+(l)+(m)").

The curing agent (r) is preferably added in such a manner that the ratio of the solid content by mass of curing agent (r) to the solid content by mass of the water-soluble urethane-modified acrylic resin and/or water-dispersible urethane-modified acrylic resin (q), i.e., (q)/(r), is in the range of 4 to 49.

The amount of the silicon oxide (l) added is preferably in the range of 3% to 40% by mass in terms of the solid content by mass with respect to (q)+(r)+(l)+(m).

The amount of the lubricant (m) added is preferably in the range of 2% to 20% by mass and more preferably 5% to 15% by mass in terms of the solid content by mass with respect to (q)+(r)+(l)+(m).

In the present invention, for example, a surfactant, called a wettability improver, used to form a uniform film on a surface to be coated, a thickener, a conductive material used to improve conductivity, a color pigment used to improve design, and a solvent used for improving film formability, may be appropriately added to the surface treatment liquid (B) used for the second layer, as needed.

(Formation of Second Layer)

As described above, in the present invention, the surface treatment liquid (B) is applied to a surface of the first layer and dried by heating to form the second layer.

Examples of a method for applying the surface treatment liquid (B) to the surface of the first layer include a roll coating method, a bar coating method, an immersion method, and a spray coating method. An optimum method is selected, depending on, for example, the shape of a zinc-based metal coated steel sheet to be treated. More specifically, for example, if a zinc-based metal coated steel sheet to be treated has a sheet shape, the surface treatment liquid is applied by a roll coating method or a bar coating method or is sprayed on a zinc-based metal coated steel sheet, and then the coating weight is adjusted with squeeze rolls or by blowing a gas thereto at high pressure. If a zinc-based metal coated steel sheet is formed into a formed article, for example, a method is selected in which the article is immersed in the surface treatment liquid and withdrawn therefrom, and in some cases, an excess of the surface treatment liquid is blown off with compressed air to adjust the coating weight.

After the application of the surface treatment liquid (B), drying is performed by heating without washing with water. However, a water-washing step may be performed after the application of the surface treatment liquid (B). A heating temperature (maximum sheet temperature) when the surface treatment liquid (B) is dried is usually in the range of 50° C. to 350° C. and more preferably 80° C. to 250° C. A heating temperature of 50° C. or higher does not cause a problem, such as a reduction in the corrosion resistance of the zinc-based metal coated steel sheet, because the solvent is not left in the second layer. A heating temperature of 350° C. or lower does not cause the problem because the occurrence of cracking of the second layer is suppressed. A heat-drying method is not particularly limited. The surface treatment liquid (B) may be dried by heating using, for example, hot air, an induction heater, infrared radiation, or near infrared radiation.

An appropriately optimized heating time is selected, depending on, for example, the type of zinc-based metal coated steel sheet used. The heating time is preferably in the range of 0.1 to 60 seconds and more preferably 1 to 30 seconds in view of, for example, productivity.

The thickness of the second layer is preferably 0.01 μm or more and less than 3 μm, and more preferably in the range of 0.1 to 2 μm after drying by heating. When the thickness after drying by heating is 0.01 μm or more, sufficient corrosion resistance and fingerprint resistance are provided. A thickness of less than 3 μm does not cause a reduction in conductivity.

In particular, the use of the hydrazine-modified organic resin (g-2) as the organic resin (g) for the second layer results in a uniform film having excellent corrosion resistance even at a small thickness. So, it is particularly advantageous when the conductivity is improved without reducing the corrosion resistance.

<Total Film Thickness>

The total thickness per side of the first layer (composite oxide film) and the second layer (organic resin film) located thereon is in the range of 0.1 to 3 μm and preferably 0.1 to 2 μm. A total thickness of less than 0.1 μm leads to insufficient corrosion resistance. A total thickness exceeding 3 μm leads to a reduction in conductivity.

To strike a balance between the corrosion resistance and the conductivity, preferably, the first layer (composite oxide film) has a thickness of 0.05 μm or more, and the second layer (organic resin film) has a thickness of 1.0 μm or less.

The present invention provides a steel sheet including the foregoing films located on one or both sides. Examples of the configuration of the steel sheet of the present invention include the following:
(1) one side: coated layer-first layer-second layer, one side: coated layer;
(2) one side: coated layer-first layer-second layer, one side: coated layer-known phosphate-treated film or the like;
(3) both sides: coated layer-first layer-second layer;
(4) one side: coated layer-first layer-second layer, one side: coated layer-first layer; and
(5) one side: coated layer-first layer-second layer, one side: coated layer-second layer.

With respect to the thicknesses of the first layer and the second layer, a thickness measurement method is not particularly limited as long as the thickness of each film can be surely measured by the method. For example, the section of the films processed by FIB is observed with a SEM. Representative elements present in the films are measured by, for example, EDX to determine the interface between the films, thereby calculating the thickness of each film. For example, thicknesses are measured at any three points per one field of view of the section observed with the SEM. The mean value of the thicknesses is defined as the thickness.

According to the present invention, it is possible to provide a zinc-based metal coated steel sheet having excellent corrosion resistance and adhesion and having excellent conductivity even under severe conditions where steel sheets are contacted at a low pressure, in particular, without reducing the corrosion resistance. The zinc-based metal coated steel sheet of the present invention may be used for various applications and suitably used as a material for use in various fields, such as architecture, electricity, and automobiles.

EXAMPLES

While advantageous effects of the present invention will be described by means of examples and comparative examples, these examples are merely examples to illustrate the present invention and are not limited to the present invention.

1. Method for Forming Test Sheet
(1) Test Sheet (Material)

Commercially available materials described below were used as test sheets.
(i) electrogalvanized steel sheet (EG): sheet thickness: 0.8 mm, weight per area: 20/20 (g/m$^2$)
(ii) hot-dip galvanized steel sheet (GI): sheet thickness 0.8 mm, weight per area: 60/60 (g/m$^2$)
(iii) hot-dip galvannealed steel sheet (GA): sheet thickness: 0.8 mm, weight per area: 40/40 (g/m$^2$)

The "weight per area" indicates the weight per area of each steel sheet. For example, in the case of the electrogalvanized steel sheet, "20/20 (g/m$^2$)" indicates that a coated layer having a weight of 20 g/m$^2$ is arranged on each side of the steel sheet.

(2) Pretreatment (Washing)

Test pieces were produced by the following process. Surfaces of the test sheets were treated with Palclean N364S (manufactured by Nihon Parkerizing Co., Ltd.) to remove oil and dirt on the surfaces. The test sheets were then washed with tap water. After checking that the test sheets were completely wetted with water, pure water (deionized water) was poured onto the test sheets. The test sheets were dried in an atmosphere having a temperature of 100° C. in an oven and then used as the test pieces.

(3) Preparation of Surface Treatment Liquid (A)

Components were mixed in water so as to achieve compositions (ratio by mass) described in Tables 1-1 to 1-4 to prepare treatment liquids (A) for zinc-coated steel sheets. $a_S$, $b_S$, $c_S$, $d_S$, $e_V$, and $f_T$ in Tables 1 represent the solid content of the resin emulsion (a), the solid content of the tetraalkoxysilane (b), the solid content of the silane coupling agent (c), the solid content of the chelating agent (d), the solid content of the vanadic acid compound (e) in terms of V, and the titanium compound (f) in terms of Ti, respectively.

TABLE 1-1

| | | Surface treatment liquid (A) | | | | | | | | | | |
|---|---|---|---|---|---|---|---|---|---|---|---|---|
| | | Composition | | | | | | | | | | |
| Test level | | Component (a) Type | Component (b) Type | Component (c) Type | Component (d) Type | Component (e) Type | Component (f) Type | Component ($a_s$) mass % (*3) | $(c_s)/(a_s)$ Ratio by mass | $(b_s)/(d_s)$ Ratio by mass | $(e_s)/(d_s)$ Ratio by mass | $(f_s)/(d_s)$ Ratio by mass | pH |
|---|---|---|---|---|---|---|---|---|---|---|---|---|---|
| Example | 1 | a1 | b1 | c1 | d1 | e1 | f1 | 11 | 5.35 | 0.50 | 0.08 | 0.06 | 4.0 |
| Example | 2 | a1 | b1 | c1 | d1 | e1 | f2 | 11 | 5.35 | 0.50 | 0.08 | 0.06 | 4.0 |
| Example | 3 | a1 | b1 | c1 | d1 | e1 | f2 | 20 | 2.41 | 0.50 | 0.08 | 0.06 | 3.0 |
| Example | 4 | a1 | b1 | c1 | d1 | e1 | f2 | 20 | 2.41 | 0.50 | 0.08 | 0.06 | 4.0 |
| Example | 5 | a1 | b1 | c1 | d1 | e1 | f2 | 20 | 2.41 | 0.50 | 0.08 | 0.06 | 5.0 |
| Example | 6 | a1 | b1 | c1 | d1 | e1 | f2 | 20 | 2.41 | 0.50 | 0.08 | 0.06 | 6.0 |
| Example | 7 | a1 | b1 | c2 | d1 | e1 | f2 | 20 | 2.41 | 0.50 | 0.08 | 0.06 | 4.0 |
| Example | 8 | a1 | b1 | c3 | d1 | e1 | f2 | 20 | 2.41 | 0.50 | 0.08 | 0.06 | 4.0 |
| Example | 9 | a1 | b1 | c1 | d1 | e1 | f2 | 40 | 1.51 | 0.83 | 0.08 | 0.06 | 4.0 |
| Example | 10 | a1 | b2 | c1 | d1 | e1 | f2 | 40 | 1.51 | 0.83 | 0.08 | 0.06 | 4.0 |
| Example | 11 | a1 | b1 | c1 | d1 | e2 | f2 | 35 | 1.51 | 0.99 | 0.08 | 0.06 | 4.0 |
| Example | 12 | a1 | b1 | c2 | d1 | e2 | f2 | 30 | 1.51 | 1.49 | 0.08 | 0.06 | 4.0 |
| Example | 13 | a2 | b2 | c1 + c2 (*1) | d2 | e2 | f2 | 45 | 1.51 | 0.50 | 0.08 | 0.06 | 4.0 |
| Example | 14 | a2 | b2 | c1 + c2 (*1) | d2 | e2 | f2 | 45 | 1.51 | 0.50 | 0.08 | 0.06 | 4.0 |
| Example | 15 | a2 | b2 | c1 + c2 (*1) | d2 | e2 | f2 | 45 | 1.51 | 0.50 | 0.08 | 0.06 | 4.0 |
| Example | 16 | a2 | b2 | c1 + c2 (*1) | d2 | e2 | f2 | 45 | 1.51 | 0.50 | 0.08 | 0.06 | 4.0 |
| Example | 17 | a2 | b2 | c1 + c2 (*1) | d2 | e2 | f2 | 45 | 1.51 | 0.50 | 0.08 | 0.06 | 4.0 |
| Example | 18 | a2 | b2 | c1 + c2 (*1) | d2 | e2 | f2 | 45 | 1.51 | 0.50 | 0.08 | 0.06 | 4.0 |
| Example | 19 | a2 | b2 | c1 + c2 (*1) | d2 | e2 | f2 | 45 | 1.51 | 0.50 | 0.08 | 0.06 | 4.0 |
| Example | 20 | a2 | b2 | c1 + c2 (*1) | d2 | e2 | f2 | 45 | 1.51 | 0.50 | 0.08 | 0.06 | 4.0 |
| Example | 21 | a2 | b2 | c1 + c2 (*1) | d2 | e2 | f2 | 45 | 1.51 | 0.50 | 0.08 | 0.06 | 4.0 |

TABLE 1-1-continued

| | | Surface treatment liquid (A) | | | | | | | | | | |
|---|---|---|---|---|---|---|---|---|---|---|---|---|
| | | Composition | | | | | | | | | | |
| Test level | | Component (a) Type | Component (b) Type | Component (c) Type | Component (d) Type | Component (e) Type | Component (f) Type | Component $(a_s)$ mass % (*3) | $(c_s)/(a_s)$ Ratio by mass | $(b_s)/(d_s)$ Ratio by mass | $(e_s)/(d_s)$ Ratio by mass | $(f_s)/(d_s)$ Ratio by mass | pH |
| Example | 22 | a2 | b2 | c1 + c2 (*1) | d2 | e2 | f2 | 45 | 1.51 | 0.50 | 0.08 | 0.06 | 4.0 |
| Example | 23 | a2 | b2 | c1 + c2 (*1) | d2 | e2 | f2 | 45 | 1.51 | 0.50 | 0.08 | 0.06 | 4.0 |
| Example | 24 | a1 | b1 | c2 | d1 | e2 | f2 | 40 | 1.66 | 0.50 | 0.08 | 0.06 | 4.0 |
| Example | 25 | a1 | b1 | c2 | d1 | e2 | f2 | 20 | 3.02 | 0.50 | 0.08 | 0.06 | 4.0 |
| Example | 26 | a1 | b1 | c1 | d1 | e1 | f2 | 20 | 4.52 | 0.50 | 0.08 | 0.06 | 4.0 |
| Example | 27 | a2 | b1 | c1 | d1 | e1 | f2 | 20 | 4.52 | 0.50 | 0.08 | 0.06 | 4.0 |
| Example | 28 | a2 | b1 | c1 | d1 | e1 | f2 | 45 | 1.51 | 0.53 | 0.08 | 0.07 | 4.0 |
| Example | 29 | a2 | b2 | c1 + c2 (*1) | d2 | e2 | f2 | 45 | 1.51 | 0.50 | 0.08 | 0.06 | 4.0 |
| Example | 30 | a2 | b1 | c1 | d1 | e1 | f2 | 30 | 1.51 | 0.25 | 0.04 | 0.03 | 4.0 |
| Example | 31 | a2 | b2 | c1 | d1 | e1 | f2 | 25 | 1.51 | 0.17 | 0.03 | 0.02 | 4.0 |
| Example | 32 | a2 | b2 | c1 | d1 | e1 | f2 | 45 | 1.51 | 0.50 | 0.10 | 0.06 | 4.0 |
| Example | 33 | a2 | b2 | c1 | d2 | e1 | f2 | 45 | 1.51 | 0.50 | 0.10 | 0.06 | 4.0 |
| Example | 34 | a2 | b2 | c1 | d2 + d3 (*2) | e1 | f2 | 45 | 1.51 | 0.50 | 0.10 | 0.06 | 4.0 |
| Example | 35 | a2 | b2 | c1 | d1 | e1 | f2 | 40 | 1.51 | 0.50 | 0.15 | 0.06 | 4.0 |
| Example | 36 | a2 | b2 | c3 | d1 | e1 | f2 | 40 | 1.51 | 0.50 | 0.23 | 0.06 | 4.0 |
| Example | 37 | a2 | b2 | c3 | d1 | e1 | f1 | 45 | 1.51 | 0.50 | 0.08 | 0.09 | 4.0 |
| Example | 38 | a2 | b2 | c1 + c2 (*1) | d2 | e2 | f2 | 45 | 1.51 | 0.50 | 0.08 | 0.06 | 4.0 |
| Example | 39 | a2 | b2 | c3 | d1 | e2 | f1 | 45 | 1.51 | 0.50 | 0.08 | 0.09 | 4.0 |
| Example | 40 | a1 | b1 | c3 | d2 | e1 | f1 | 45 | 1.51 | 0.50 | 0.08 | 0.13 | 4.0 |

(*1) The ratio (by mass) of c1 to c2 is 1:1.
(*2) The ratio (by mass) of d2 to d3 is 1:1.
(*3) The proportion (solid content) of the solid $(a_s)$ of component (a) in surface treatment liquid (A)

TABLE 1-2

| | | Surface treatment liquid (A) | | | | | | | | | | |
|---|---|---|---|---|---|---|---|---|---|---|---|---|
| | | Composition | | | | | | | | | | |
| Test level | | Component (a) Type | Component (b) Type | Component (c) Type | Component (d) Type | Component (e) Type | Component (f) Type | Component $(a_s)$ mass % (*3) | $(c_s)/(a_s)$ Ratio by mass | $(b_s)/(d_s)$ Ratio by mass | $(e_s)/(d_s)$ Ratio by mass | $(f_s)/(d_s)$ Ratio by mass | pH |
| Example | 41 | a1 | b1 | c3 | d2 | e1 | f1 | 40 | 1.51 | 0.50 | 0.08 | 0.19 | 4.0 |
| Example | 42 | a1 | b1 | c3 | d2 | e1 | f1 | 40 | 1.51 | 0.50 | 0.08 | 0.06 | 4.0 |
| Example | 43 | a1 | b1 | c3 | d2 | e1 | f1 | 40 | 1.51 | 0.50 | 0.08 | 0.06 | 4.0 |
| Example | 44 | a1 | b1 | c3 | d2 | e1 | f1 | 40 | 1.51 | 0.50 | 0.08 | 0.06 | 4.0 |
| Example | 45 | a1 | b1 | c3 | d2 | e1 | f1 | 40 | 1.51 | 0.50 | 0.08 | 0.06 | 4.0 |
| Example | 46 | a1 | b1 | c3 | d2 | e1 | f1 | 40 | 1.51 | 0.50 | 0.08 | 0.06 | 4.0 |
| Example | 47 | a1 | b1 | c3 | d2 | e1 | f1 | 40 | 1.51 | 0.50 | 0.08 | 0.06 | 4.0 |
| Example | 48 | a1 | b1 | c3 | d2 | e1 | f1 | 40 | 1.51 | 0.50 | 0.08 | 0.06 | 4.0 |
| Example | 49 | a1 | b1 | c3 | d2 | e1 | f1 | 40 | 1.51 | 0.50 | 0.08 | 0.06 | 4.0 |
| Example | 50 | a1 | b1 | c3 | d2 | e1 | f1 | 40 | 1.51 | 0.50 | 0.08 | 0.06 | 4.0 |
| Example | 51 | a1 | b1 | c3 | d2 | e1 | f1 | 40 | 1.51 | 0.50 | 0.08 | 0.06 | 4.0 |
| Example | 52 | a1 | b1 | c3 | d2 | e1 | f1 | 40 | 1.51 | 0.50 | 0.08 | 0.06 | 4.0 |
| Comparative Example | 53 | a1 | b1 | c1 | d2 | e1 | f1 | 5 | 12.03 | 0.50 | 0.08 | 0.06 | 4.0 |
| Comparative Example | 54 | a1 | b1 | c1 | d2 | e1 | f1 | 65 | 0.91 | 0.50 | 0.08 | 0.06 | 4.0 |
| Comparative Example | 55 | a1 | b1 | c1 | d2 | e1 | f2 | 48 | 1.51 | 0.12 | 0.08 | 0.06 | 4.0 |
| Comparative Example | 56 | a2 | b1 | c1 | d2 | e1 | f2 | 27 | 1.51 | 1.99 | 0.08 | 0.06 | 4.0 |
| Comparative Example | 57 | a2 | b1 | c1 | d2 | e1 | f2 | 70 | 0.38 | 0.50 | 0.08 | 0.06 | 4.0 |
| Comparative Example | 58 | a2 | b2 | c3 | d2 | e1 | f2 | 13 | 6.03 | 0.50 | 0.08 | 0.06 | 4.0 |
| Comparative Example | 59 | a2 | b2 | c3 | d2 | e2 | f1 | 50 | 1.51 | 1.99 | 0.30 | 0.25 | 4.0 |
| Comparative Example | 60 | a2 | b2 | c3 | d1 | e2 | f1 | 22 | 1.51 | 0.12 | 0.02 | 0.02 | 4.0 |
| Comparative Example | 61 | a1 | b1 | c2 | d1 | e1 | f2 | 47 | 1.51 | 0.50 | 0.08 | 0.01 | 4.0 |
| Comparative Example | 62 | a1 | b1 | c2 | d1 | e1 | f2 | 35 | 1.51 | 0.50 | 0.08 | 0.25 | 4.0 |

TABLE 1-2-continued

| | | Surface treatment liquid (A) | | | | | | | | | | |
|---|---|---|---|---|---|---|---|---|---|---|---|---|
| | | Composition | | | | | | | | | | |
| Test level | | Component (a) Type | Component (b) Type | Component (c) Type | Component (d) Type | Component (e) Type | Component (f) Type | Component ($a_s$) mass % (*3) | $(c_s)/(a_s)$ Ratio by mass | $(b_s)/(d_s)$ Ratio by mass | $(e_s)/(d_s)$ Ratio by mass | $(f_s)/(d_s)$ Ratio by mass | pH |
| Comparative Example | 63 | a1 | b1 | c2 | d1 | e1 | f2 | 20 | 2.41 | 0.50 | 0.08 | 0.06 | 2.0 |
| Comparative Example | 64 | a1 | b1 | c2 | d1 | e1 | f2 | 20 | 2.41 | 0.50 | 0.08 | 0.06 | 7.0 |
| Comparative Example | 65 | a2 | b2 | c1 + c2 (*1) | d2 | e2 | f2 | 45 | 1.51 | 0.50 | 0.08 | 0.06 | 4.0 |
| Comparative Example | 66 | a2 | b2 | c1 + c2 (*1) | d2 | e2 | f2 | 45 | 1.51 | 0.50 | 0.08 | 0.06 | 4.0 |
| Comparative Example | 67 | — | b1 | c1 | d2 | e1 | f2 | 0 | — | 0.50 | 0.08 | 0.06 | 4.0 |
| Comparative Example | 68 | a2 | — | c3 | d1 | e2 | f1 | 6 | 12.03 | 0.00 | 0.08 | 0.06 | 4.0 |
| Comparative Example | 69 | a1 | b1 | — | d1 | e2 | f2 | 14 | 0 | 0.50 | 0.08 | 0.06 | 4.0 |
| Comparative Example | 70 | a1 | b1 | c2 | — | e2 | f2 | 6 | 12.03 | — | — | — | 4.0 |
| Comparative Example | 71 | a1 | b1 | c2 | d1 | — | f2 | 5 | 12.03 | 0.50 | 0.00 | 0.06 | 4.0 |
| Comparative Example | 72 | a1 | b1 | c2 | d1 | e2 | — | 5 | 12.03 | 0.50 | 0.08 | 0.00 | 4.0 |
| Example | 73 | a2 | b2 | c1 + c2 (*1) | d2 | e2 | f2 | 45 | 1.51 | 0.50 | 0.08 | 0.06 | 4.0 |
| Example | 74 | a2 | b2 | c1 + c2 (*1) | d2 | e2 | f2 | 45 | 1.51 | 0.50 | 0.08 | 0.06 | 4.0 |
| Example | 75 | a2 | b2 | c1 + c2 (*1) | d2 | e2 | f2 | 45 | 1.51 | 0.50 | 0.08 | 0.06 | 4.0 |
| Example | 76 | a2 | b2 | c1 + c2 (*1) | d2 | e2 | f2 | 45 | 1.51 | 0.50 | 0.08 | 0.06 | 4.0 |
| Example | 77 | a2 | b2 | c1 + c2 (*1) | d2 | e2 | f2 | 45 | 1.51 | 0.50 | 0.08 | 0.06 | 4.0 |
| Example | 78 | a2 | b2 | c1 + c2 (*1) | d2 | e2 | f2 | 45 | 1.51 | 0.50 | 0.08 | 0.06 | 40 |
| Example | 79 | a2 | b2 | c1 + c2 (*1) | d2 | e2 | f2 | 45 | 1.51 | 0.50 | 0.08 | 0.06 | 4.0 |
| Example | 80 | a2 | b2 | c1 + c2 (*1) | d2 | e2 | f2 | 45 | 1.51 | 0.50 | 0.08 | 0.06 | 4.0 |

(*1) The ratio (by mass) of c1 to c2 is 1:1.
(*3) The proportion (solid content) of the solid ($a_s$) of component (a) in surface treatment liquid (A)

TABLE 1-3

| | | Surface treatment liquid (A) | | | | | | | | | | |
|---|---|---|---|---|---|---|---|---|---|---|---|---|
| | | Composition | | | | | | | | | | |
| Test level | | Component (a) Type | Component (b) Type | Component (c) Type | Component (d) Type | Component (e) Type | Component (f) Type | Component ($a_s$) mass % (*3) | $(c_s)/(a_s)$ Ratio by mass | $(b_s)/(d_s)$ Ratio by mass | $(e_s)/(d_s)$ Ratio by mass | $(f_s)/(d_s)$ Ratio by mass | pH |
| Example | 81 | a2 | b2 | c1 + c2 (*1) | d2 | e2 | f2 | 45 | 1.51 | 0.50 | 0.08 | 0.06 | 4.0 |
| Example | 82 | a2 | b2 | c1 + c2 (*1) | d2 | e2 | f2 | 45 | 1.51 | 0.50 | 0.08 | 0.06 | 4.0 |
| Example | 83 | a2 | b2 | c1 + c2 (*1) | d2 | e2 | f2 | 45 | 1.51 | 0.50 | 0.08 | 0.06 | 4.0 |
| Example | 84 | a2 | b2 | c1 + c2 (*1) | d2 | e2 | f2 | 45 | 1.51 | 0.50 | 0.08 | 0.06 | 4.0 |
| Example | 85 | a2 | b2 | c1 + c2 (*1) | d2 | e2 | f2 | 45 | 1.51 | 0.50 | 0.08 | 0.06 | 4.0 |
| Example | 86 | a2 | b2 | c1 + c2 (*1) | d2 | e2 | f2 | 45 | 1.51 | 0.50 | 0.08 | 0.06 | 4.0 |
| Example | 87 | a2 | b2 | c1 + c2 (*1) | d2 | e2 | f2 | 45 | 1.51 | 0.50 | 0.08 | 0.06 | 4.0 |
| Example | 88 | a2 | b2 | c1 + c2 (*1) | d2 | e2 | f2 | 45 | 1.51 | 0.50 | 0.08 | 0.06 | 4.0 |
| Example | 89 | a2 | b2 | c1 + c2 (*1) | d2 | e2 | f2 | 45 | 1.51 | 0.50 | 0.08 | 0.06 | 4.0 |
| Example | 90 | a2 | b2 | c1 + c2 (*1) | d2 | e2 | f2 | 45 | 1.51 | 0.50 | 0.08 | 0.06 | 4.0 |
| Example | 91 | a2 | b2 | c1 + c2 (*1) | d2 | e2 | f2 | 45 | 1.51 | 0.50 | 0.08 | 0.06 | 4.0 |
| Example | 92 | a2 | b2 | c1 + c2 (*1) | d2 | e2 | f2 | 45 | 1.51 | 0.50 | 0.08 | 0.06 | 4.0 |
| Example | 93 | a2 | b2 | c1 + c2 (*1) | d2 | e2 | f2 | 45 | 1.51 | 0.50 | 0.08 | 0.06 | 4.0 |
| Example | 94 | a2 | b2 | c1 + c2 (*1) | d2 | e2 | f2 | 45 | 1.51 | 0.50 | 0.08 | 0.06 | 4.0 |
| Example | 95 | a2 | b2 | c1 + c2 (*1) | d2 | e2 | f2 | 45 | 1.51 | 0.50 | 0.08 | 0.06 | 4.0 |
| Example | 96 | a2 | b2 | c1 + c2 (*1) | d2 | e2 | f2 | 45 | 1.51 | 0.50 | 0.08 | 0.06 | 4.0 |
| Example | 97 | a2 | b2 | c1 + c2 (*1) | d2 | e2 | f2 | 45 | 1.51 | 0.50 | 0.08 | 0.06 | 4.0 |
| Example | 98 | a2 | b2 | c1 + c2 (*1) | d2 | e2 | f2 | 45 | 1.51 | 0.50 | 0.08 | 0.06 | 4.0 |
| Example | 99 | a2 | b2 | c1 + c2 (*1) | d2 | e2 | f2 | 45 | 1.51 | 0.50 | 0.08 | 0.06 | 4.0 |
| Example | 100 | a2 | b2 | c1 + c2 (*1) | d2 | e2 | f2 | 45 | 1.51 | 0.50 | 0.08 | 0.06 | 4.0 |
| Example | 101 | a2 | b2 | c1 + c2 (*1) | d2 | e2 | f2 | 45 | 1.51 | 0.50 | 0.08 | 0.06 | 4.0 |
| Example | 102 | a2 | b2 | c1 + c2 (*1) | d2 | e2 | f2 | 45 | 1.51 | 0.50 | 0.08 | 0.06 | 4.0 |
| Example | 103 | a2 | b2 | c1 + c2 (*1) | d2 | e2 | f2 | 45 | 1.51 | 0.50 | 0.08 | 0.06 | 4.0 |
| Example | 104 | a2 | b2 | c1 + c2 (*1) | d2 | e2 | f2 | 45 | 1.51 | 0.50 | 0.08 | 0.06 | 4.0 |

TABLE 1-3-continued

| | | Surface treatment liquid (A) | | | | | | | | | | |
|---|---|---|---|---|---|---|---|---|---|---|---|---|
| | | Composition | | | | | | | | | | |
| Test level | | Component (a) Type | Component (b) Type | Component (c) Type | Component (d) Type | Component (e) Type | Component (f) Type | Component $(a_s)$ mass % (*3) | $(c_s)/(a_s)$ Ratio by mass | $(b_s)/(d_s)$ Ratio by mass | $(e_s)/(d_s)$ Ratio by mass | $(f_s)/(d_s)$ Ratio by mass | pH |
| Example | 105 | a2 | b2 | c1 + c2 (*1) | d2 | e2 | f2 | 45 | 1.51 | 0.50 | 0.08 | 0.06 | 4.0 |
| Example | 106 | a2 | b2 | c1 + c2 (*1) | d2 | e2 | f2 | 45 | 1.51 | 0.50 | 0.08 | 0.06 | 4.0 |
| Example | 107 | a2 | b2 | c1 + c2 (*1) | d2 | e2 | f2 | 45 | 1.51 | 0.50 | 0.08 | 0.06 | 4.0 |
| Example | 108 | a2 | b2 | c1 + c2 (*1) | d2 | e2 | f2 | 45 | 1.51 | 0.50 | 0.08 | 0.06 | 4.0 |
| Example | 109 | a2 | b2 | c1 + c2 (*1) | d2 | e2 | f2 | 45 | 1.51 | 0.50 | 0.08 | 0.06 | 4.0 |
| Example | 110 | a2 | b2 | c1 + c2 (*1) | d2 | e2 | f2 | 45 | 1.51 | 0.50 | 0.08 | 0.06 | 4.0 |
| Example | 111 | a2 | b2 | c1 + c2 (*1) | d2 | e2 | f2 | 45 | 1.51 | 0.50 | 0.08 | 0.06 | 4.0 |
| Comparative Example | 112 | a2 | b2 | c1 + c2 (*1) | d2 | e2 | f2 | 45 | 1.51 | 0.50 | 0.08 | 0.06 | 4.0 |
| Comparative Example | 113 | — | — | — | — | — | — | — | — | — | — | — | — |
| Comparative Example | 114 | — | — | — | — | — | — | — | — | — | — | — | — |
| Comparative Example | 115 | a2 | b2 | c1 + c2 (*1) | d2 | e2 | f2 | 45 | 1.51 | 0.50 | 0.08 | 0.06 | 4.0 |
| Comparative Example | 116 | a2 | b2 | c1 + c2 (*1) | d2 | e2 | f2 | 45 | 1.51 | 0.50 | 0.08 | 0.06 | 4.0 |
| Example | 117 | a2 | b2 | c1 + c2 (*1) | d2 | e2 | f2 | 45 | 1.51 | 0.50 | 0.08 | 0.06 | 4.0 |
| Example | 118 | a2 | b2 | c1 + c2 (*1) | d2 | e2 | f2 | 45 | 1.51 | 0.50 | 0.08 | 0.06 | 4.0 |
| Example | 119 | a2 | b2 | c1 + c2 (*1) | d2 | e2 | f2 | 45 | 1.51 | 0.50 | 0.08 | 0.06 | 4.0 |
| Example | 120 | a2 | b2 | c1 + c2 (*1) | d2 | e2 | f2 | 45 | 1.51 | 0.50 | 0.08 | 0.06 | 4.0 |

(*1) The ratio (by mass) of c1 to c2 is 1:1.
(*3) The proportion (solid content) of the solid $(a_s)$ of component (a) in surface treatment liquid (A)

TABLE 1-4

| | | Surface treatment liquid (A) | | | | | | | | | | |
|---|---|---|---|---|---|---|---|---|---|---|---|---|
| | | Composition | | | | | | | | | | |
| Test level | | Component (a) Type | Component (b) Type | Component (c) Type | Component (d) Type | Component (e) Type | Component (f) Type | Component $(a_s)$ mass % (*3) | $(c_s)/(a_s)$ Ratio by mass | $(b_s)/(d_s)$ Ratio by mass | $(e_s)/(d_s)$ Ratio by mass | $(f_s)/(d_s)$ Ratio by mass | pH |
| Example | 121 | a2 | b2 | c1 + c2 (*1) | d2 | e2 | f2 | 45 | 1.51 | 0.50 | 0.08 | 0.06 | 4.0 |
| Example | 122 | a2 | b2 | c1 + c2 (*1) | d2 | e2 | f2 | 45 | 1.51 | 0.50 | 0.08 | 0.06 | 4.0 |
| Example | 123 | a2 | b2 | c1 + c2 (*1) | d2 | e2 | f2 | 45 | 1.51 | 0.50 | 0.08 | 0.06 | 4.0 |
| Example | 124 | a2 | b2 | c1 + c2 (*1) | d2 | e2 | f2 | 45 | 1.51 | 0.50 | 0.08 | 0.06 | 4.0 |
| Example | 125 | a2 | b2 | c1 + c2 (*1) | d2 | e2 | f2 | 45 | 1.51 | 0.50 | 0.08 | 0.06 | 4.0 |
| Example | 126 | a2 | b2 | c1 + c2 (*1) | d2 | e2 | f2 | 45 | 1.51 | 0.50 | 0.08 | 0.06 | 4.0 |
| Example | 127 | a2 | b2 | c1 + c2 (*1) | d2 | e2 | f2 | 45 | 1.51 | 0.50 | 0.08 | 0.06 | 4.0 |
| Example | 128 | a2 | b2 | c1 + c2 (*1) | d2 | e2 | f2 | 45 | 1.51 | 0.50 | 0.08 | 0.06 | 4.0 |
| Example | 129 | a2 | b2 | c1 + c2 (*1) | d2 | e2 | f2 | 45 | 1.51 | 0.50 | 0.08 | 0.06 | 4.0 |
| Example | 130 | a2 | b2 | c1 + c2 (*1) | d2 | e2 | f2 | 45 | 1.51 | 0.50 | 0.08 | 0.06 | 4.0 |
| Example | 131 | a2 | b2 | c1 + c2 (*1) | d2 | e2 | f2 | 45 | 1.51 | 0.50 | 0.08 | 0.06 | 4.6 |
| Example | 132 | a2 | b2 | c1 + c2 (*1) | d2 | e2 | f2 | 45 | 1.51 | 0.50 | 0.08 | 0.06 | 4.0 |
| Example | 133 | a2 | b2 | c1 + c2 (*1) | d2 | e2 | f2 | 45 | 1.51 | 0.50 | 0.08 | 0.06 | 4.0 |
| Example | 134 | a2 | b2 | c1 + c2 (*1) | d2 | e2 | f2 | 45 | 1.51 | 0.50 | 0.08 | 0.06 | 4.0 |
| Example | 135 | a2 | b2 | c1 + c2 (*1) | d2 | e2 | f2 | 45 | 1.51 | 0.50 | 0.08 | 0.06 | 4.0 |
| Example | 136 | a2 | b2 | c1 + c2 (*1) | d2 | e2 | f2 | 45 | 1.51 | 0.50 | 0.08 | 0.06 | 4.0 |
| Example | 137 | a2 | b2 | c1 + c2 (*1) | d2 | e2 | f2 | 45 | 1.51 | 0.50 | 0.08 | 0.06 | 4.0 |
| Example | 138 | a2 | b2 | c1 + c2 (*1) | d2 | e2 | f2 | 45 | 1.51 | 0.50 | 0.08 | 0.06 | 4.0 |
| Example | 139 | a2 | b2 | c1 + c2 (*1) | d2 | e2 | f2 | 45 | 1.51 | 0.50 | 0.08 | 0.06 | 4.0 |
| Example | 140 | a2 | b2 | c1 + c2 (*1) | d2 | e2 | f2 | 45 | 1.51 | 0.50 | 0.08 | 0.06 | 4.0 |
| Example | 141 | a2 | b2 | c1 + c2 (*1) | d2 | e2 | f2 | 45 | 1.51 | 0.50 | 0.08 | 0.06 | 4.0 |
| Example | 142 | a2 | b2 | c1 + c2 (*1) | d2 | e2 | f2 | 45 | 1.51 | 0.50 | 0.08 | 0.06 | 4.0 |
| Example | 143 | a2 | b2 | c1 + c2 (*1) | d2 | e2 | f2 | 45 | 1.51 | 0.50 | 0.08 | 0.06 | 4.0 |
| Example | 144 | a2 | b2 | c1 + c2 (*1) | d2 | e2 | f2 | 45 | 1.51 | 0.50 | 0.08 | 0.06 | 4.0 |
| Example | 145 | a2 | b2 | c1 + c2 (*1) | d2 | e2 | f2 | 45 | 1.51 | 0.50 | 0.08 | 0.06 | 4.0 |
| Example | 146 | a2 | b2 | c1 + c2 (*1) | d2 | e2 | f2 | 45 | 1.51 | 0.50 | 0.08 | 0.06 | 4.0 |
| Example | 147 | a2 | b2 | c1 + c2 (*1) | d2 | e2 | f2 | 45 | 1.51 | 0.50 | 0.08 | 0.06 | 4.0 |
| Example | 148 | a2 | b2 | c1 + c2 (*1) | d2 | e2 | f2 | 45 | 1.51 | 0.50 | 0.08 | 0.06 | 4.0 |
| Example | 149 | a2 | b2 | c1 + c2 (*1) | d2 | e2 | f2 | 45 | 1.51 | 0.50 | 0.08 | 0.06 | 4.0 |
| Example | 150 | a2 | b2 | c1 + c2 (*1) | d2 | e2 | f2 | 45 | 1.51 | 0.50 | 0.08 | 0.06 | 4.0 |

TABLE 1-4-continued

| | | | | | | Composition | | | | | | |
|---|---|---|---|---|---|---|---|---|---|---|---|---|
| Test level | | Component (a) Type | Component (b) Type | Component (c) Type | Component (d) Type | Component (e) Type | Component (f) Type | Component (a$_s$) mass % (*3) | (c$_s$)/(a$_s$) Ratio by mass | (b$_s$)/(d$_s$) Ratio by mass | (e$_s$)/(d$_s$) Ratio by mass | (f$_s$)/(d$_s$) Ratio by mass | pH |
| Example | 151 | a2 | b2 | c1 + c2 (*1) | d2 | e2 | f2 | 45 | 1.51 | 0.50 | 0.08 | 0.06 | 4.0 |
| Example | 152 | a2 | b2 | c1 + c2 (*1) | d2 | e2 | f2 | 45 | 1.51 | 0.50 | 0.08 | 0.06 | 4.0 |
| Example | 153 | a2 | b2 | c1 + c2 (*1) | d2 | e2 | f2 | 45 | 1.51 | 0.50 | 0.08 | 0.06 | 4.0 |
| Comparative Example | 154 | a2 | b2 | c1 + c2 (*1) | d2 | e2 | f2 | 45 | 1.51 | 0.50 | 0.08 | 0.06 | 4.0 |
| Comparative Example | 155 | a2 | b2 | c1 + c2 (*1) | d2 | e2 | f2 | 45 | 1.51 | 0.50 | 0.08 | 0.06 | 4.0 |

(*1) The ratio (by mass) of c1 to c2 is 1:1.
(*3) The proportion (solid content) of the solid (a$_s$) of component (a) in surface treatment liquid (A)

Compounds in Tables 1-1 to 1-4 are described below.
<Resin Emulsion (a) Containing Cationic Urethane Resin Emulsion (a-1) and/or Nonionic Acrylic Resin Emulsion (a-2)>
a1: styrene-ethyl methacrylate-n-butyl acrylate-acrylic acid copolymer (nonionic acrylic resin emulsion (a-2))
a2: ADEKA BONTIGHTER HUX-670 (cationic urethane resin emulsion (a-1))
<Tetraalkoxysilane (b)>
b1: tetraethoxysilane
b2: tetramethoxysilane
<Silane Coupling Agent (c)>
c1: γ-glycidyltriethoxysilane
c2: 3-mercaptopropyltrimethoxysilane
c3: N-(2-aminoethyl)-3-aminopropyltrimethoxysilane
<Chelating Agent (d)>
d1: 1-hydroxymethane-1.1-diphosphonic acid
d2: acetic acid
d3: phosphoric acid
<Vanadic Acid Compound (e)>
e1: ammonium metavanadate
e2: vanadyl acetylacetonate (V: 19.2%)
<Titanium Compound (f)>
f1: ammonium fluorotitanate
f2: titanium acetylacetonate (Ti: 12.5%)
(4) Preparation of Surface Treatment Liquid (B)
The surface treatment liquids (B) appropriately containing additives, described in Tables 2-1 to 2-4, mixed with the organic resins (g1 to g7) described below were prepared. Concentrations of the organic resins (g), described in Tables 2-1 to 2-4, in the surface treatment liquid (B) were in the range of 4 to 10 g/l. The amounts of the components (k), (l), and (m) are expressed in terms of proportions in the base resin (g).

TABLE 2-1

| | | Surface treatment liquid (B) | | | | |
|---|---|---|---|---|---|---|
| | | Organic resin | | | | |
| | | | Concentration | Additive | Mixing ratio (ratio by mass) | |
| Test level | | Type | (*4) | Type | g:(k + l) | g:m |
| Example | 1 | g6 | 10 | — | — | — |
| Example | 2 | g6 | 10 | — | — | — |
| Example | 3 | g6 | 10 | — | — | — |
| Example | 4 | g6 | 10 | — | — | — |

TABLE 2-1-continued

| | | Surface treatment liquid (B) | | | | |
|---|---|---|---|---|---|---|
| | | Organic resin | | | | |
| | | | Concentration | Additive | Mixing ratio (ratio by mass) | |
| Test level | | Type | (*4) | Type | g:(k + l) | g:m |
| Example | 5 | g6 | 10 | — | — | — |
| Example | 6 | g6 | 10 | — | — | — |
| Example | 7 | g6 | 10 | — | — | — |
| Example | 8 | g6 | 10 | — | — | — |
| Example | 9 | g6 | 10 | — | — | — |
| Example | 10 | g6 | 10 | — | — | — |
| Example | 11 | g6 | 10 | — | — | — |
| Example | 12 | g6 | 10 | — | — | — |
| Example | 13 | g6 | 10 | — | — | — |
| Example | 14 | g6 | 10 | — | — | — |
| Example | 15 | g6 | 10 | — | — | — |
| Example | 16 | g6 | 10 | — | — | — |
| Example | 17 | g6 | 8 | k1 + l1 (*5) | 100:30 | — |
| Example | 18 | g6 | 8 | l2 | 100:30 | — |
| Example | 19 | g4 | 10 | — | — | — |
| Example | 20 | g5 | 10 | — | — | — |
| Example | 21 | g6 | 10 | — | — | — |
| Example | 22 | g6 | 10 | — | — | — |
| Example | 23 | g6 | 10 | — | — | — |
| Example | 24 | g6 | 10 | — | — | — |
| Example | 25 | g6 | 10 | — | — | — |
| Example | 26 | g6 | 10 | — | — | — |
| Example | 27 | g6 | 10 | — | — | — |
| Example | 28 | g6 | 10 | — | — | — |
| Example | 29 | g6 | 10 | — | — | — |
| Example | 30 | g6 | 10 | — | — | — |
| Example | 31 | g6 | 10 | — | — | — |
| Example | 32 | g6 | 10 | — | — | — |
| Example | 33 | g6 | 10 | — | — | — |
| Example | 34 | g6 | 10 | — | — | — |
| Example | 35 | g6 | 10 | — | — | — |
| Example | 36 | g6 | 10 | — | — | — |
| Example | 37 | g6 | 10 | — | — | — |
| Example | 38 | g6 | 10 | — | — | — |
| Example | 39 | g6 | 10 | — | — | — |
| Example | 40 | g6 | 10 | — | — | — |

(*4) indicates the concentration (g/n) of base resin g in surface treatment liquid (B).
(*5) The mixing ratio (ratio by mass) of k1 to l1 is 1:1.
(*6) The mixing ratio (ratio by mass) of k1 to l1 to n1 is 1:1:0.1.
(*7) The mixing ratio (ratio by mass) of k1 to l1 to o1 is 1:1:0.1.
((*8) The mixing ratio (ratio by mass) of k1 to l1 to n1 to o1 is 1:1:0.1:0.1.

TABLE 2-2

| Test level | | Surface treatment liquid (B) | | | | |
|---|---|---|---|---|---|---|
| | | Organic resin | | Additive | Mixing ratio (ratio by mass) | |
| | | Type | Concentration (*4) | Type | g:(k + l) | g:m |
| Example | 41 | g6 | 10 | — | — | — |
| Example | 42 | g6 | 10 | — | — | — |
| Example | 43 | g6 | 10 | — | — | — |
| Example | 44 | g6 | 10 | — | — | — |
| Example | 45 | g6 | 10 | — | — | — |
| Example | 46 | g6 | 8 | k1 + l1 (*5) | 100:30 | — |
| Example | 47 | g6 | 8 | l2 | 100:30 | — |
| Example | 48 | g4 | 10 | — | — | — |
| Example | 49 | g5 | 10 | — | — | — |
| Example | 50 | g6 | 10 | — | — | — |
| Example | 51 | g6 | 10 | — | — | — |
| Example | 52 | g6 | 10 | — | — | — |
| Comparative Example | 53 | g6 | 10 | — | — | — |
| Comparative Example | 54 | g6 | 10 | — | — | — |
| Comparative Example | 55 | g6 | 10 | — | — | — |
| Comparative Example | 56 | g6 | 10 | — | — | — |
| Comparative Example | 57 | g6 | 10 | — | — | — |
| Comparative Example | 58 | g6 | 10 | — | — | — |
| Comparative Example | 59 | — | — | — | — | — |
| Comparative Example | 60 | g6 | 10 | — | — | — |
| Comparative Example | 61 | g6 | 10 | — | — | — |
| Comparative Example | 62 | — | — | — | — | — |
| Comparative Example | 63 | g6 | 10 | — | — | — |
| Comparative Example | 64 | g6 | 10 | — | — | — |
| Comparative Example | 65 | g6 | 10 | — | — | — |
| Comparative Example | 66 | g6 | 10 | — | — | — |
| Comparative Example | 67 | g6 | 10 | — | — | — |
| Comparative Example | 68 | g6 | 10 | — | — | — |
| Comparative Example | 69 | g6 | 10 | — | — | — |
| Comparative Example | 70 | g6 | 10 | — | — | — |
| Comparative Example | 71 | g6 | 10 | — | — | — |
| Comparative Example | 72 | g6 | 10 | — | — | — |
| Example | 73 | g1 | 10 | — | — | — |
| Example | 74 | g2 | 10 | — | — | — |
| Example | 75 | g3 | 10 | — | — | — |
| Example | 76 | g7 | 10 | — | — | — |
| Example | 77 | g3 | 8 | l2 | 100:30 | — |
| Example | 78 | g3 | 8 | k1 + l1 (*5) | 100:30 | — |
| Example | 79 | g3 | 8 | k1 + l1 + n1 (*6) | 100:30 | — |
| Example | 80 | g3 | 8 | k1 + l1 + o1 (*7) | 100:30 | — |

(*4) indicates the concentration (g/n) of base resin g in surface treatment liquid (B).
(*5) The mixing ratio (ratio by mass) of k1 to l1 is 1:1.
(*6) The mixing ratio (ratio by mass) of k1 to l1 to n1 is 1:1:0.1.
(*7) The mixing ratio (ratio by mass) of k1 to l1 to o1 is 1:1:0.1.
((*8) The mixing ratio (ratio by mass) of k1 to l1 to n1 to o1 is 1:1:0.1:0.1.

TABLE 2-3

| Test level | | Surface treatment liquid (B) | | | | |
|---|---|---|---|---|---|---|
| | | Organic resin | | Additive | Mixing ratio (ratio by mass) | |
| | | Type | Concentration (*4) | Type | g:(k + l) | g:m |
| Example | 81 | g3 | 8 | k1 + l1 + n1 + o1 (*8) | 100:30 | — |
| Example | 82 | g3 | 10 | m1 | — | 100:3 |
| Example | 83 | g3 | 8 | l2 + m1 | 100:30 | 100:3 |
| Example | 84 | g3 | 8 | k1 + l1 (*5) + m1 | 100:30 | 100:3 |
| Example | 85 | g3 | 8 | l3 | 100:30 | — |
| Example | 86 | g3 | 8 | l3 + m1 | 100:30 | 100:3 |
| Example | 87 | g3 | 10 | — | — | — |
| Example | 88 | g3 | 10 | — | — | — |
| Example | 89 | g3 | 10 | — | — | — |
| Example | 90 | g3 | 10 | — | — | — |
| Example | 91 | g3 | 10 | — | — | — |
| Example | 92 | g3 | 10 | — | — | — |
| Example | 93 | g3 | 10 | — | — | — |
| Example | 94 | g3 | 10 | — | — | — |
| Example | 95 | g3 | 10 | — | — | — |
| Example | 96 | g3 | 10 | — | — | — |
| Example | 97 | g3 | 10 | — | — | — |
| Example | 98 | g3 | 10 | — | — | — |
| Example | 99 | g3 | 10 | — | — | — |
| Example | 100 | g3 | 10 | — | — | — |
| Example | 101 | g3 | 10 | — | — | — |
| Example | 102 | g3 | 10 | — | — | — |
| Example | 103 | g3 | 10 | — | — | — |
| Example | 104 | g3 | 10 | — | — | — |
| Example | 105 | g3 | 10 | — | — | — |
| Example | 106 | g4 | 10 | — | — | — |
| Example | 107 | g4 | 10 | — | — | — |
| Example | 108 | g4 | 10 | — | — | — |
| Example | 109 | g4 | 10 | — | — | — |
| Example | 110 | g4 | 10 | — | — | — |
| Example | 111 | g4 | 10 | — | — | — |
| Comparative Example | 112 | — | — | — | — | — |
| Comparative Example | 113 | g3 | 10 | — | — | — |
| Comparative Example | 114 | g4 | 10 | — | — | — |
| Comparative Example | 115 | g3 | 10 | — | — | — |
| Comparative Example | 116 | g4 | 10 | — | — | — |
| Example | 117 | g6 | 10 | l2 | 100:5 | — |
| Example | 118 | g6 | 9 | l2 | 100:10 | — |
| Example | 119 | g6 | 6 | l2 | 100:70 | — |
| Example | 120 | g6 | 5 | l2 | 100:100 | — |

(*4) indicates the concentration (g/n) of base resin g in surface treatment liquid (B).
(*5) The mixing ratio (ratio by mass) of k1 to l1 is 1:1.
(*6) The mixing ratio (ratio by mass) of k1 to l1 to n1 is 1:1:0.1.
(*7) The mixing ratio (ratio by mass) of k1 to l1 to o1 is 1:1:0.1.
((*8) The mixing ratio (ratio by mass) of k1 to l1 to n1 to o1 is 1:1:0.1:0.1.

TABLE 2-4

| Test level | | Surface treatment liquid (B) | | | | |
|---|---|---|---|---|---|---|
| | | Organic resin | | Additive | Mixing ratio (ratio by mass) | |
| | | Type | Concentration (*4) | Type | g:(k + l) | g:m |
| Example | 121 | g7 | 9 | l2 | 100:10 | — |
| Example | 122 | g7 | 8 | l2 | 100:30 | — |
| Example | 123 | g7 | 6 | l2 | 100:70 | — |
| Example | 124 | g6 | 8 | k1 | 100:30 | — |

TABLE 2-4-continued

| | | Surface treatment liquid (B) | | | |
|---|---|---|---|---|---|
| | | Organic resin | | | |
| | | | Concentration | Additive | Mixing ratio (ratio by mass) |
| Test level | | Type | (*4) | Type | g:(k + l) g:m |
| Example | 125 | g6 | 8 | k1 | 100:30 — |
| Example | 126 | g6 | 9 | k1 + l1 (*5) | 100:10 — |
| Example | 127 | g6 | 8 | k1 + l1 (*5) | 100:30 — |
| Example | 128 | g6 | 6 | k1 + l1 (*5) | 100:70 — |
| Example | 129 | g7 | 9 | k1 + l1 (*5) | 100:10 — |
| Example | 130 | g7 | 8 | k1 + l1 (*5) | 100:30 — |
| Example | 131 | g7 | 6 | k1 + l1 (*5) | 100:70 — |
| Example | 132 | g6 | 10 | l1 | 100:5 — |
| Example | 133 | g7 | 10 | l1 | 100:5 — |
| Example | 134 | g6 | 8 | l2 | 100:30 — |
| Example | 135 | g6 | 8 | l2 | 100:30 — |
| Example | 136 | g6 | 8 | l2 | 100:30 — |
| Example | 137 | g6 | 8 | l2 | 100:30 — |
| Example | 138 | g6 | 8 | l2 | 100:30 — |
| Example | 139 | g6 | 8 | l2 | 100:30 — |
| Example | 140 | g6 | 8 | l2 | 100:30 — |
| Example | 141 | g6 | 8 | l2 | 100:30 — |
| Example | 142 | g6 | 8 | l2 | 100:30 — |
| Example | 143 | g6 | 8 | l2 | 100:30 — |
| Example | 144 | g6 | 8 | l2 | 100:30 — |
| Example | 145 | g6 | 8 | l2 | 100:30 — |
| Example | 146 | g6 | 8 | l2 | 100:30 — |
| Example | 147 | g6 | 8 | l2 | 100:30 — |
| Example | 148 | g6 | 8 | l2 | 100:30 — |
| Example | 149 | g6 | 8 | l2 | 100:30 — |
| Example | 150 | g6 | 8 | l2 | 100:30 — |
| Example | 151 | g6 | 8 | l2 | 100:30 — |
| Example | 152 | g6 | 8 | l2 | 100:30 — |
| Example | 153 | g6 | 4 | l2 | 100:150 — |
| Comparative Example | 154 | — | 0 | l2 | 0:30 — |
| Comparative Example | 155 | — | 0 | k1 + l1 (*5) | 0:30 — |

(*4) indicates the concentration (g/n) of base resin g in surface treatment liquid (B).
(*5) The mixing ratio (ratio by mass) of k1 to l1 is 1:1.
(*6) The mixing ratio (ratio by mass) of k1 to l1 to n1 is 1:1:0.1.
(*7) The mixing ratio (ratio by mass) of k1 to l1 to o1 is 1:1:0.1.
((*8) The mixing ratio (ratio by mass) of k1 to l1 to n1 to o1 is 1:1:0.1:0.1.

Compounds in Tables 2-1 to 2-4 are described below.
<Organic Resin: Organic Resin that does not Contain OH Group and/or COOH Group>
g1: polyolefin resin (Model: HYTEC S-3121, manufactured by TOHO Chemical Industry Co., Ltd.)
g2: fluorocarbon resin (Model: Lumiflon LF552, manufactured by Asahi Glass Co., Ltd.)
<Organic Resin: Organic Resin (g-1) Containing OH Group and/or COOH Group>
g3: epoxy resin (Model: jER1009, manufactured by Japan Epoxy Resin Co., Ltd.)
g4: urethane resin (Model: Superflex E-2000, manufactured by Dai-Ichi Kogyo Seiyaku Co., Ltd.)
g5: alkyd resin (Model: PHTHALKYD W2343, manufactured by Hitachi Chemical Company, Ltd.)
<Organic Resin: Hydrazine-Modified Organic Resin (g-2)>
g6: [Synthesis Example 1]
EP828 (manufactured by Yuka Shell Epoxy K.K., epoxy equivalent: 187) (1870 parts by mass), bisphenol A (91 2 parts by mass), tetraethylammonium bromide (2 parts by mass), and methyl isobutyl ketone (300 parts by mass) were charged into a four-necked flask. The mixture was heated to 140° C. and reacted for 4 hours to give an epoxy resin having an epoxy equivalent of 1391 and a solid content of 90% by mass. Ethylene glycol mono-n-butyl ether (1500 parts by mass) was added thereto. The mixture was cooled to 100° C. Then 3,5-dimethylpyrazole (molecular weight: 96) (96 parts by mass) and dibutylamine (molecular weight: 129) (129 parts by mass) were added thereto. The mixture was reacted for 6 hours until the epoxy groups disappear. Methyl isobutyl ketone (205 parts by mass) was then added thereto with cooling, thereby yielding a pyrazole-modified epoxy resin having a solid content of 60% by mass. This resin is defined as an organic resin (g6). The organic resin (g6) is a reaction product of the organic resin (C) and the active hydrogen-containing compound (i) that contains the active hydrogen-containing hydrazine derivative (h) in an amount of 50 mol %.
g7: [Synthesis Example 2]
EP1007 (manufactured by Japan Epoxy Resin Co., Ltd., epoxy equivalent: 2000) (4000 parts by mass) and ethylene glycol mono-butyl ether (2239 parts by mass) were charged into a four-necked flask. The mixture was heated to 120° C. to completely dissolve the epoxy resin in 1 hour. The solution was cooled to 100° C. Then 3-amino-1,2,4-triazole (molecular weight: 84) (168 parts by mass) was added thereto. The mixture was reacted for 6 hours until the epoxy groups disappear. Methyl isobutyl ketone (540 parts by mass) was then added thereto with cooling, thereby yielding a triazole-modified epoxy resin having a solid content of 60% by mass. This resin is defined as an organic resin (g7). The organic resin (g7) is a reaction product of the organic resin (C) and the active hydrogen-containing compound (i) that contains the active hydrogen-containing hydrazine derivative (h) in an amount of 100 mol %.
<Ca Ion-Exchanged Silica (k)>
k1: Ca ion-exchanged silica (Model: SHIELDEX C303, manufactured by W. R. Grace & Co.)
<Silicon oxide (l)>
l1: fumed silica (Model: AEROSIL 200, manufactured by Nihon Aerosil Co., Ltd.)
l2: organosilica sol (Model: Organosilica Sol MA-ST-MS, manufactured by Nissan Chemical Industries Ltd.)
l3: colloidal silica (Model: Snowtex 30, manufactured by Nissan Chemical Industries Ltd.)
<Lubricant (m)>
m1: polyethylene wax (Model: Ceridust 3620, manufactured by Clariant (Japan) K.K.)
<Phosphate (n)>
n1: zinc phosphate
<Molybdate (o)>
o1: aluminum molybdate
(5) Method for Producing Zinc-Based Metal Coated Steel Sheet The surface treatment liquid (A) was applied to one surface of each of the test pieces by bar coating. The resulting test pieces were not washed with water. The test pieces were placed in an induction furnace and dried by heating at drying temperatures described in Tables 3-1 to 3-4, thereby forming films having thicknesses (μm) described in Tables 3-1 to 3-4. The surface treatment liquid (B) for the formation of the second layer was applied to a surface of each of the films. The test pieces were placed in the induction furnace and dried by heating at drying temperatures described in Tables 3-1 to 3-4, thereby forming films having thicknesses (μm) described in Tables 3-1 to 3-4. Thereby, zinc-based metal coated steel sheets according to examples and comparative examples were produced.

The heat-drying temperature was adjusted on the basis of induction heating power. Note that, the heat-drying temperature corresponds to the maximum temperature of the surface of the test piece.

A specific bar coating method is as follows.

Each of the surface treatment liquids was dropped on a corresponding one of the test pieces and applied with a bar coater (selected from rod Nos. 3 to 5). The thickness of each film was adjusted by selecting the rod number of the bar coater and the concentration of the surface treatment liquid so as to obtain the thicknesses described in Tables 3-1 to 3-4.

TABLE 3-1

| Test level | | Test sheet Type | Treatment method of surface treatment liquid (A) | | | Treatment method of surface treatment liquid (B) | | | Total film thickness μm |
|---|---|---|---|---|---|---|---|---|---|
| | | | Coating method Type | Thickness μm | Drying temperature °C. | Coating method Type | Thickness μm | Drying temperature °C. | |
| Example | 1 | (i) | Bar coating | 0.15 | 140 | Bar coating | 0.5 | 140 | 0.65 |
| Example | 2 | (i) | Bar coating | 0.15 | 140 | Bar coating | 0.5 | 140 | 0.65 |
| Example | 3 | (i) | Bar coating | 0.15 | 140 | Bar coating | 0.5 | 140 | 0.65 |
| Example | 4 | (i) | Bar coating | 0.15 | 140 | Bar coating | 0.5 | 140 | 0.65 |
| Example | 5 | (i) | Bar coating | 0.15 | 140 | Bar coating | 0.5 | 140 | 0.65 |
| Example | 6 | (i) | Bar coating | 0.15 | 140 | Bar coating | 0.5 | 140 | 0.65 |
| Example | 7 | (i) | Bar coating | 0.15 | 140 | Bar coating | 0.5 | 140 | 0.65 |
| Example | 8 | (i) | Bar coating | 0.15 | 140 | Bar coating | 0.5 | 140 | 0.65 |
| Example | 9 | (i) | Bar coating | 0.15 | 140 | Bar coating | 0.5 | 140 | 0.65 |
| Example | 10 | (i) | Bar coating | 0.15 | 140 | Bar coating | 0.5 | 140 | 0.65 |
| Example | 11 | (i) | Bar coating | 0.15 | 140 | Bar coating | 0.5 | 140 | 0.65 |
| Example | 12 | (i) | Bar coating | 0.15 | 140 | Bar coating | 0.5 | 140 | 0.65 |
| Example | 13 | (i) | Bar coating | 0.01 | 140 | Bar coating | 0.5 | 140 | 0.51 |
| Example | 14 | (i) | Bar coating | 0.05 | 140 | Bar coating | 0.5 | 140 | 0.55 |
| Example | 15 | (i) | Bar coating | 0.1 | 140 | Bar coating | 0.5 | 140 | 0.6 |
| Example | 16 | (i) | Bar coating | 0.2 | 140 | Bar coating | 0.5 | 140 | 0.7 |
| Example | 17 | (i) | Bar coating | 0.2 | 140 | Bar coating | 0.5 | 140 | 0.7 |
| Example | 18 | (i) | Bar coating | 0.2 | 140 | Bar coating | 0.5 | 140 | 0.7 |
| Example | 19 | (i) | Bar coating | 0.2 | 140 | Bar coating | 0.5 | 140 | 0.7 |
| Example | 20 | (i) | Bar coating | 0.2 | 140 | Bar coating | 0.5 | 140 | 0.7 |
| Example | 21 | (i) | Bar coating | 0.3 | 140 | Bar coating | 0.5 | 140 | 0.8 |
| Example | 22 | (i) | Bar coating | 0.5 | 140 | Bar coating | 0.5 | 140 | 1.0 |
| Example | 23 | (i) | Bar coating | 0.8 | 140 | Bar coating | 0.5 | 140 | 1.3 |
| Example | 24 | (i) | Bar coating | 0.15 | 140 | Bar coating | 0.5 | 140 | 0.65 |
| Example | 25 | (i) | Bar coating | 0.15 | 140 | Bar coating | 0.5 | 140 | 0.65 |
| Example | 26 | (i) | Bar coating | 0.15 | 140 | Bar coating | 0.5 | 140 | 0.65 |
| Example | 27 | (i) | Bar coating | 0.15 | 140 | Bar coating | 0.5 | 140 | 0.65 |
| Example | 28 | (i) | Bar coating | 0.15 | 140 | Bar coating | 0.5 | 140 | 0.65 |
| Example | 29 | (ii) | Bar coating | 0.15 | 140 | Bar coating | 0.5 | 140 | 0.65 |
| Example | 30 | (i) | Bar coating | 0.15 | 140 | Bar coating | 0.5 | 140 | 0.65 |
| Example | 31 | (i) | Bar coating | 0.15 | 140 | Bar coating | 0.5 | 140 | 0.65 |
| Example | 32 | (i) | Bar coating | 0.15 | 140 | Bar coating | 0.5 | 140 | 0.65 |
| Example | 33 | (i) | Bar coating | 0.15 | 140 | Bar coating | 0.5 | 140 | 0.65 |
| Example | 34 | (i) | Bar coating | 0.15 | 140 | Bar coating | 0.5 | 140 | 0.65 |
| Example | 35 | (i) | Bar coating | 0.15 | 140 | Bar coating | 0.5 | 140 | 0.65 |
| Example | 36 | (i) | Bar coating | 0.15 | 140 | Bar coating | 0.5 | 140 | 0.65 |
| Example | 37 | (i) | Bar coating | 0.15 | 140 | Bar coating | 0.5 | 140 | 0.65 |
| Example | 38 | (iii) | Bar coating | 0.15 | 140 | Bar coating | 0.5 | 140 | 0.65 |
| Example | 39 | (i) | Bar coating | 0.15 | 140 | Bar coating | 0.5 | 140 | 0.65 |
| Example | 40 | (i) | Bar coating | 0.15 | 140 | Bar coating | 0.5 | 140 | 0.65 |

TABLE 3-2

| Test level | | Test sheet Type | Treatment method of surface treatment liquid (A) | | | Treatment method of surface treatment liquid (B) | | | Total film thickness μm |
|---|---|---|---|---|---|---|---|---|---|
| | | | Coating method Type | Thickness μm | Drying temperature °C. | Coating method Type | Thickness μm | Drying temperature °C. | |
| Example | 41 | (i) | Bar coating | 0.15 | 140 | Bar coating | 0.5 | 140 | 0.65 |
| Example | 42 | (i) | Bar coating | 0.01 | 140 | Bar coating | 0.5 | 140 | 0.51 |
| Example | 43 | (i) | Bar coating | 0.05 | 140 | Bar coating | 0.5 | 140 | 0.55 |
| Example | 44 | (i) | Bar coating | 0.1 | 140 | Bar coating | 0.5 | 140 | 0.6 |
| Example | 45 | (i) | Bar coating | 0.2 | 140 | Bar coating | 0.5 | 140 | 0.7 |
| Example | 46 | (i) | Bar coating | 0.2 | 140 | Bar coating | 0.5 | 140 | 0.7 |
| Example | 47 | (i) | Bar coating | 0.2 | 140 | Bar coating | 0.5 | 140 | 0.7 |
| Example | 48 | (i) | Bar coating | 0.2 | 140 | Bar coating | 0.5 | 140 | 0.7 |
| Example | 49 | (i) | Bar coating | 0.2 | 140 | Bar coating | 0.5 | 140 | 0.7 |
| Example | 50 | (i) | Bar coating | 0.3 | 140 | Bar coating | 0.5 | 140 | 0.8 |
| Example | 51 | (i) | Bar coating | 0.5 | 140 | Bar coating | 0.5 | 140 | 1.0 |
| Example | 52 | (i) | Bar coating | 0.8 | 140 | Bar coating | 0.5 | 140 | 1.3 |
| Comparative Example | 53 | (i) | Bar coating | 0.15 | 140 | Bar coating | 0.5 | 140 | 0.65 |

TABLE 3-2-continued

|  |  | Test sheet Type | Treatment method of surface treatment liquid (A) | | | Treatment method of surface treatment liquid (B) | | | Total film thickness μm |
|---|---|---|---|---|---|---|---|---|---|
| Test level | | | Coating method Type | Thickness μm | Drying temperature °C. | Coating method Type | Thickness μm | Drying temperature °C. | |
| Comparative Example | 54 | (i) | Bar coating | 0.15 | 140 | Bar coating | 0.5 | 140 | 0.65 |
| Comparative Example | 55 | (i) | Bar coating | 0.15 | 140 | Bar coating | 0.5 | 140 | 0.65 |
| Comparative Example | 56 | (i) | Bar coating | 0.15 | 140 | Bar coating | 0.5 | 140 | 0.65 |
| Comparative Example | 57 | (i) | Bar coating | 0.15 | 140 | Bar coating | 0.5 | 140 | 0.65 |
| Comparative Example | 58 | (i) | Bar coating | 0.15 | 140 | Bar coating | 0.5 | 140 | 0.65 |
| Comparative Example | 59 | — | — | — | — | — | — | — | — |
| Comparative Example | 60 | (i) | Bar coating | 0.15 | 140 | Bar coating | 0.5 | 140 | 0.65 |
| Comparative Example | 61 | (i) | Bar coating | 0.15 | 140 | Bar coating | 0.5 | 140 | 0.65 |
| Comparative Example | 62 | — | — | — | — | — | — | — | — |
| Comparative Example | 63 | (i) | Bar coating | 0.15 | 140 | Bar coating | 0.5 | 140 | 0.65 |
| Comparative Example | 64 | (i) | Bar coating | 0.15 | 140 | Bar coating | 0.5 | 140 | 0.65 |
| Comparative Example | 65 | (i) | Bar coating | 0.005 | 140 | Bar coating | 0.005 | 140 | 0.01 |
| Comparative Example | 66 | (i) | Bar coating | 1.5 | 140 | Bar coating | 2.0 | 140 | 3.5 |
| Comparative Example | 67 | (i) | Bar coating | 0.15 | 140 | Bar coating | 0.5 | 140 | 0.65 |
| Comparative Example | 68 | (i) | Bar coating | 0.15 | 140 | Bar coating | 0.5 | 140 | 0.65 |
| Comparative Example | 69 | (i) | Bar coating | 0.15 | 140 | Bar coating | 0.5 | 140 | 0.65 |
| Comparative Example | 70 | (i) | Bar coating | 0.15 | 140 | Bar coating | 0.5 | 140 | 0.65 |
| Comparative Example | 71 | (i) | Bar coating | 0.15 | 140 | Bar coating | 0.5 | 140 | 0.65 |
| Comparative Example | 72 | (i) | Bar coating | 0.15 | 140 | Bar coating | 0.5 | 140 | 0.65 |
| Example | 73 | (i) | Bar coating | 0.15 | 140 | Bar coating | 0.5 | 140 | 0.65 |
| Example | 74 | (i) | Bar coating | 0.15 | 140 | Bar coating | 0.5 | 140 | 0.65 |
| Example | 75 | (i) | Bar coating | 0.15 | 140 | Bar coating | 0.5 | 140 | 0.65 |
| Example | 76 | (i) | Bar coating | 0.15 | 140 | Bar coating | 0.5 | 140 | 0.65 |
| Example | 77 | (i) | Bar coating | 0.15 | 140 | Bar coating | 0.5 | 140 | 0.65 |
| Example | 78 | (i) | Bar coating | 0.15 | 140 | Bar coating | 0.5 | 140 | 0.65 |
| Example | 79 | (i) | Bar coating | 0.15 | 140 | Bar coating | 0.5 | 140 | 0.65 |
| Example | 80 | (i) | Bar coating | 0.15 | 140 | Bar coating | 0.50 | 140 | 0.65 |

TABLE 3-3

|  |  | Test sheet Type | Treatment method of surface treatment liquid (A) | | | Treatment method of surface treatment liquid (B) | | | Total film thickness μm |
|---|---|---|---|---|---|---|---|---|---|
| Test level | | | Coating method Type | Thickness μm | Drying temperature °C. | Coating method Type | Thickness μm | Drying temperature °C. | |
| Example | 81 | (i) | Bar coating | 0.15 | 140 | Bar coating | 0.5 | 140 | 0.65 |
| Example | 82 | (i) | Bar coating | 0.15 | 140 | Bar coating | 0.5 | 140 | 0.65 |
| Example | 83 | (i) | Bar coating | 0.15 | 140 | Bar coating | 0.5 | 140 | 0.65 |
| Example | 84 | (i) | Bar coating | 0.15 | 140 | Bar coating | 0.5 | 140 | 0.65 |
| Example | 85 | (i) | Bar coating | 0.15 | 140 | Bar coating | 0.5 | 140 | 0.65 |
| Example | 86 | (i) | Bar coating | 0.15 | 140 | Bar coating | 0.5 | 140 | 0.65 |
| Example | 87 | (i) | Bar coating | 0.15 | 140 | Bar coating | 0.01 | 140 | 0.16 |
| Example | 88 | (i) | Bar coating | 0.15 | 140 | Bar coating | 0.05 | 140 | 0.2 |
| Example | 89 | (i) | Bar coating | 0.15 | 140 | Bar coating | 0.1 | 140 | 0.25 |
| Example | 90 | (i) | Bar coating | 0.15 | 140 | Bar coating | 0.3 | 140 | 0.45 |
| Example | 91 | (i) | Bar coating | 0.15 | 140 | Bar coating | 1.0 | 140 | 1.15 |
| Example | 92 | (i) | Bar coating | 0.15 | 140 | Bar coating | 2.0 | 140 | 2.15 |
| Example | 93 | (i) | Bar coating | 0.10 | 140 | Bar coating | 0.3 | 140 | 0.4 |

TABLE 3-3-continued

| Test level | | Test sheet Type | Treatment method of surface treatment liquid (A) | | | Treatment method of surface treatment liquid (B) | | | Total film thickness μm |
|---|---|---|---|---|---|---|---|---|---|
| | | | Coating method Type | Thickness μm | Drying temperature °C. | Coating method Type | Thickness μm | Drying temperature °C. | |
| Example | 94 | (i) | Bar coating | 0.10 | 140 | Bar coating | 1.0 | 140 | 1.1 |
| Example | 95 | (i) | Bar coating | 0.20 | 140 | Bar coating | 0.3 | 140 | 0.5 |
| Example | 96 | (i) | Bar coating | 0.20 | 140 | Bar coating | 1.0 | 140 | 1.20 |
| Example | 97 | (i) | Bar coating | 0.05 | 140 | Bar coating | 2.5 | 140 | 2.55 |
| Example | 98 | (i) | Bar coating | 0.50 | 140 | Bar coating | 0.01 | 140 | 0.51 |
| Example | 99 | (i) | Bar coating | 0.50 | 140 | Bar coating | 2.5 | 140 | 3.00 |
| Example | 100 | (i) | Bar coating | 0.01 | 140 | Bar coating | 0.01 | 140 | 0.02 |
| Example | 101 | (i) | Bar coating | 0.15 | 140 | Bar coating | 0.5 | 50 | 0.65 |
| Example | 102 | (i) | Bar coating | 0.15 | 140 | Bar coating | 0.5 | 100 | 0.65 |
| Example | 103 | (i) | Bar coating | 0.15 | 140 | Bar coating | 0.5 | 200 | 0.65 |
| Example | 104 | (i) | Bar coating | 0.15 | 140 | Bar coating | 0.5 | 250 | 0.65 |
| Example | 105 | (i) | Bar coating | 0.15 | 140 | Bar coating | 0.5 | 350 | 0.65 |
| Example | 106 | (i) | Bar coating | 0.15 | 140 | Bar coating | 0.3 | 140 | 0.45 |
| Example | 107 | (i) | Bar coating | 0.15 | 140 | Bar coating | 1.0 | 140 | 1.15 |
| Example | 108 | (i) | Bar coating | 0.10 | 140 | Bar coating | 0.3 | 140 | 0.4 |
| Example | 109 | (i) | Bar coating | 0.10 | 140 | Bar coating | 1.0 | 140 | 1.1 |
| Example | 110 | (i) | Bar coating | 0.20 | 140 | Bar coating | 0.3 | 140 | 0.5 |
| Example | 111 | (i) | Bar coating | 0.20 | 140 | Bar coating | 1.0 | 140 | 1.2 |
| Comparative Example | 112 | (i) | Bar coating | 0.15 | 140 | — | 0 | — | 0.15 |
| Comparative Example | 113 | (i) | — | 0 | — | Bar coating | 0.5 | 140 | 0.5 |
| Comparative Example | 114 | (i) | — | 0 | — | Bar coating | 0.5 | 140 | 0.5 |
| Comparative Example | 115 | (i) | Bar coating | 0.15 | 140 | Bar coating | 3.0 | 140 | 3.15 |
| Comparative Example | 116 | (i) | Bar coating | 0.15 | 140 | Bar coating | 3.0 | 140 | 3.15 |
| Example | 117 | (i) | Bar coating | 0.15 | 140 | Bar coating | 0.5 | 140 | 0.65 |
| Example | 118 | (i) | Bar coating | 0.15 | 140 | Bar coating | 0.5 | 140 | 0.65 |
| Example | 119 | (i) | Bar coating | 0.15 | 140 | Bar coating | 0.5 | 140 | 0.65 |
| Example | 120 | (i) | Bar coating | 0.15 | 140 | Bar coating | 0.5 | 140 | 0.65 |

TABLE 3-4

| Test level | | Test sheet Type | Treatment method of surface treatment liquid (A) | | | Treatment method of surface treatment liquid (B) | | | Total film thickness μm |
|---|---|---|---|---|---|---|---|---|---|
| | | | Coating method Type | Thickness μm | Drying temperature °C. | Coating method Type | Thickness μm | Drying temperature °C. | |
| Example | 121 | (i) | Bar coating | 0.15 | 140 | Bar coating | 0.5 | 140 | 0.65 |
| Example | 122 | (i) | Bar coating | 0.15 | 140 | Bar coating | 0.5 | 140 | 0.65 |
| Example | 123 | (i) | Bar coating | 0.15 | 140 | Bar coating | 0.5 | 140 | 0.65 |
| Example | 124 | (i) | Bar coating | 0.15 | 140 | Bar coating | 0.5 | 140 | 0.65 |
| Example | 125 | (i) | Bar coating | 0.15 | 140 | Bar coating | 0.5 | 140 | 0.65 |
| Example | 126 | (i) | Bar coating | 0.15 | 140 | Bar coating | 0.5 | 140 | 0.65 |
| Example | 127 | (i) | Bar coating | 0.15 | 140 | Bar coating | 0.5 | 140 | 0.65 |
| Example | 128 | (i) | Bar coating | 0.15 | 140 | Bar coating | 0.5 | 140 | 0.65 |
| Example | 129 | (i) | Bar coating | 0.15 | 140 | Bar coating | 0.5 | 140 | 0.65 |
| Example | 130 | (i) | Bar coating | 0.15 | 140 | Bar coating | 0.5 | 140 | 0.65 |
| Example | 131 | (i) | Bar coating | 0.15 | 140 | Bar coating | 0.5 | 140 | 0.65 |
| Example | 132 | (i) | Bar coating | 0.15 | 140 | Bar coating | 0.5 | 140 | 0.65 |
| Example | 133 | (i) | Bar coating | 0.15 | 140 | Bar coating | 0.5 | 140 | 0.65 |
| Example | 134 | (i) | Bar coating | 0.15 | 140 | Bar coating | 0.01 | 140 | 0.16 |
| Example | 135 | (i) | Bar coating | 0.15 | 140 | Bar coating | 0.05 | 140 | 0.2 |
| Example | 136 | (i) | Bar coating | 0.15 | 140 | Bar coating | 0.1 | 140 | 0.25 |
| Example | 137 | (i) | Bar coating | 0.15 | 140 | Bar coating | 0.3 | 140 | 0.45 |
| Example | 138 | (i) | Bar coating | 0.15 | 140 | Bar coating | 1.0 | 140 | 1.15 |
| Example | 139 | (i) | Bar coating | 0.15 | 140 | Bar coating | 2.0 | 140 | 2.15 |
| Example | 140 | (i) | Bar coating | 0.10 | 140 | Bar coating | 0.3 | 140 | 0.40 |
| Example | 141 | (i) | Bar coating | 0.10 | 140 | Bar coating | 1.0 | 140 | 1.1 |
| Example | 142 | (i) | Bar coating | 0.20 | 140 | Bar coating | 0.3 | 140 | 0.5 |
| Example | 143 | (i) | Bar coating | 0.20 | 140 | Bar coating | 1.0 | 140 | 1.2 |
| Example | 144 | (i) | Bar coating | 0.05 | 140 | Bar coating | 2.5 | 140 | 2.55 |
| Example | 145 | (i) | Bar coating | 0.50 | 140 | Bar coating | 0.01 | 140 | 0.51 |
| Example | 146 | (i) | Bar coating | 0.50 | 140 | Bar coating | 2.5 | 140 | 3.0 |
| Example | 147 | (i) | Bar coating | 0.01 | 140 | Bar coating | 0.01 | 140 | 0.02 |
| Example | 148 | (i) | Bar coating | 0.15 | 140 | Bar coating | 0.5 | 50 | 0.65 |

TABLE 3-4-continued

| Test level | | Test sheet Type | Treatment method of surface treatment liquid (A) | | | Treatment method of surface treatment liquid (B) | | | Total film thickness μm |
|---|---|---|---|---|---|---|---|---|---|
| | | | Coating method Type | Thickness μm | Drying temperature °C. | Coating method Type | Thickness μm | Drying temperature °C. | |
| Example | 149 | (i) | Bar coating | 0.15 | 140 | Bar coating | 0.5 | 100 | 0.65 |
| Example | 150 | (i) | Bar coating | 0.15 | 140 | Bar coating | 0.5 | 200 | 0.65 |
| Example | 151 | (i) | Bar coating | 0.15 | 140 | Bar coating | 0.5 | 250 | 0.65 |
| Example | 152 | (i) | Bar coating | 0.15 | 140 | Bar coating | 0.5 | 350 | 0.65 |
| Example | 153 | (i) | Bar coating | 0.15 | 140 | Bar coating | 0.5 | 140 | 0.65 |
| Comparative Example | 154 | (i) | Bar coating | 0.15 | 140 | Bar coating | 0.5 | 140 | 0.65 |
| Comparative Example | 155 | (i) | Bar coating | 0.15 | 140 | Bar coating | 0.5 | 140 | 0.65 |

(6) Evaluation Test Method
(6-1) Evaluation of Corrosion Resistance

Test pieces each measuring 70 by 150 mm were cut out from each test sheet on which the two films had been formed. The back surface and ends of each test piece were sealed with a vinyl tape. The test pieces were subjected to a salt-water spray test (SST) complying with JIS-Z-2371-2000. The corrosion resistance was evaluated on the basis of the time required to cause the area proportion of white rust to reach 5% during the salt-water spray test. Evaluation criteria are described below.

Evaluation Criteria
⊙: The length of time the area proportion of white rust reaches 5% is 240 hours or more.
○: The length of time the area proportion of white rust reaches 5% is 192 hours or more and less than 240 hours.
○–: The length of time the area proportion of white rust reaches 5% is 144 hours or more and less than 192 hours.
Δ: The length of time the area proportion of white rust reaches 5% is 72 hours or more and less than 144 hours.
x: The length of time the area proportion of white rust reaches 5% is less than 72 hours.

(6-2) Evaluation of Overcoatability (Adhesion)

A commercially available melamine alkyd paint was applied to test pieces each having the same size as described above in such a manner that the resulting coating films each had a thickness of 30 μm after baking at 140° C. for 30 minutes. The test pieces were immersed in boiling water for 2 hours. Cuts extending to base steel were made on a surface of each test piece with an NT cutter to form a grid pattern divided into 100 sections each measuring 1 mm by 1 mm. The test piece was pushed out by 5 mm with an Erichsen tester in such a manner that the cut portion faced outward. The Erichsen test was performed under the following conditions complying with JIS-Z-2247-2006 (symbol of the Erichsen value: IE): punch diameter: 20 mm, die diameter: 27 mm, and drawing width: 27 mm. After the Erichsen test, a tape peel test was performed to evaluate the overcoatability (adhesion) on the basis of the state of the coating film. Evaluation criteria are described below.

Evaluation Criteria
⊙: Peeled area is zero and less than 50.
○: Peeled area is 5% or more and less than 10%.
Δ: Peeled area is 10% or more and less than 20%.
x: Peeled area is 20% or more.

(6-3) Evaluation of Conductivity

The surface resistance of each of the test pieces was measured using an ESP probe of Loresta GP (manufactured by Mitsubishi Chemical Analytech Co., Ltd). The surface resistance was measured while a load on the probe was increased in increments of 50 g. The conductivity was evaluated on the basis of the minimum load that allowed the surface resistance to be $10^{-4} \Omega$ or less.

⊙: The average load at 10 points is less than 400 g.
○: The average load at 10 points is 400 g or more and less than 600 g.
○–: The average load at 10 points is 600 g or more and less than 800 g.
Δ: The average load at 10 points is 800 g or more and less than 950 g.
x: The average load at 10 points is 950 g or more.

(6-4) Evaluation of Shelf Stability (Storage Stability)

Surface treatment liquids (A) having the compositions described in Tables 1-1 to 1-4 were stored in a constant temperature oven set at 40° C. for 30 days. The appearance of the surface treatment liquids was visually evaluated.

⊙: No change is observed.
○: Extraordinarily minute amounts of precipitates are observed.
Δ: Minute amounts of precipitates are observed. Alternatively, the viscosity is slightly increased.
x: Large amounts of precipitates are observed. Alternatively, gelation occurs.

Evaluations described in items (6-1) to (6-4) were performed for the zinc-based metal coated steel sheets produced by use of the surface treatment liquids described in examples and comparative examples. The evaluation results are described in Tables 4-1 to 4-4.

Note that in Comparative Examples 59 and 62, the surface treatment liquids were unstable, thus failing to form a film. So, the evaluations were not performed.

TABLE 4-1

| Test level | | Corrosion resistance | Adhesion | Conductivity | Shelf stability |
|---|---|---|---|---|---|
| Example | 1 | ⊙ | ⊙ | ⊙ | ⊙ |
| Example | 2 | ⊙ | ⊙ | ⊙ | ⊙ |
| Example | 3 | ⊙ | ⊙ | ○ | ⊙ |
| Example | 4 | ⊙ | ⊙ | ⊙ | ⊙ |
| Example | 5 | ⊙ | ⊙ | ⊙ | ⊙ |
| Example | 6 | ⊙ | ○ | ⊙ | ⊙ |
| Example | 7 | ⊙ | ⊙ | ⊙ | ⊙ |
| Example | 8 | ⊙ | ⊙ | ⊙ | ⊙ |
| Example | 9 | ⊙ | ⊙ | ⊙ | ⊙ |
| Example | 10 | ⊙ | ⊙ | ⊙ | ⊙ |
| Example | 11 | ⊙ | ⊙ | ⊙ | ⊙ |
| Example | 12 | ○ | ⊙ | ⊙ | ⊙ |
| Example | 13 | ○ | ⊙ | ⊙ | ⊙ |
| Example | 14 | ⊙ | ⊙ | ⊙ | ⊙ |
| Example | 15 | ⊙ | ⊙ | ⊙ | ⊙ |
| Example | 16 | ⊙ | ⊙ | ⊙ | ⊙ |

TABLE 4-1-continued

| Test level | Corrosion resistance | Adhesion | Conductivity | Shelf stability |
|---|---|---|---|---|
| Example 17 | ◎ | ◎ | ◎ | ◎ |
| Example 18 | ◎ | ◎ | ◎ | ◎ |
| Example 19 | ◎ | ◎ | ◎ | ◎ |
| Example 20 | ◎ | ◎ | ◎ | ◎ |
| Example 21 | ◎ | ◎ | ◎ | ◎ |
| Example 22 | ◎ | ◎ | ○ | ◎ |
| Example 23 | ◎ | ◎ | ○- | ◎ |
| Example 24 | ○ | ◎ | ◎ | ◎ |
| Example 25 | ◎ | ◎ | ◎ | ◎ |
| Example 26 | ◎ | ◎ | ◎ | ◎ |
| Example 27 | ◎ | ○ | ◎ | ◎ |
| Example 28 | ◎ | ◎ | ◎ | ○ |
| Example 29 | ◎ | ◎ | ◎ | ◎ |
| Example 30 | ◎ | ◎ | ◎ | ◎ |
| Example 31 | ◎ | ◎ | ◎ | ◎ |
| Example 32 | ○ | ◎ | ◎ | ◎ |
| Example 33 | ◎ | ◎ | ◎ | ◎ |
| Example 34 | ◎ | ◎ | ○ | ◎ |
| Example 35 | ◎ | ◎ | ◎ | ◎ |
| Example 36 | ◎ | ◎ | ◎ | ○ |
| Example 37 | ◎ | ◎ | ◎ | ◎ |
| Example 38 | ○ | ◎ | ◎ | ◎ |
| Example 39 | ◎ | ◎ | ◎ | ◎ |
| Example 40 | ◎ | ◎ | ◎ | ◎ |

TABLE 4-2

| Test level | Corrosion resistance | Adhesion | Conductivity | Shelf stability |
|---|---|---|---|---|
| Example 41 | ◎ | ◎ | ◎ | ○ |
| Example 42 | ○ | ◎ | ◎ | ◎ |
| Example 43 | ◎ | ◎ | ◎ | ◎ |
| Example 44 | ◎ | ◎ | ◎ | ◎ |
| Example 45 | ◎ | ◎ | ◎ | ◎ |
| Example 46 | ◎ | ◎ | ◎ | ◎ |
| Example 47 | ◎ | ◎ | ◎ | ◎ |
| Example 48 | ◎ | ◎ | ◎ | ◎ |
| Example 49 | ◎ | ◎ | ◎ | ◎ |
| Example 50 | ◎ | ◎ | ◎ | ◎ |
| Example 51 | ◎ | ◎ | ○ | ◎ |
| Example 52 | ◎ | ◎ | ○- | ◎ |
| Comparative Example 53 | ○ | X | ○ | ◎ |
| Comparative Example 54 | X | ○ | △ | △ |
| Comparative Example 55 | X | ○ | △ | ○ |
| Comparative Example 56 | X | ○ | ◎ | ○ |
| Comparative Example 57 | X | ○ | △ | △ |
| Comparative Example 58 | ○ | X | △ | △ |
| Comparative Example 59 | — | — | — | — |
| Comparative Example 60 | X | ○ | ◎ | △ |
| Comparative Example 61 | X | ○ | ◎ | △ |
| Comparative Example 62 | — | — | — | — |
| Comparative Example 63 | ○ | ○ | X | X |
| Comparative Example 64 | ○ | X | ◎ | △ |
| Comparative Example 65 | X | ○ | ◎ | ◎ |
| Comparative Example 66 | ◎ | ○ | X | ◎ |
| Comparative Example 67 | X | X | ○ | ◎ |
| Comparative Example 68 | X | X | X | ◎ |

TABLE 4-2-continued

| Test level | Corrosion resistance | Adhesion | Conductivity | Shelf stability |
|---|---|---|---|---|
| Comparative Example 69 | X | X | X | ◎ |
| Comparative Example 70 | X | X | X | X |
| Comparative Example 71 | X | X | X | ◎ |
| Comparative Example 72 | X | X | X | ◎ |
| Example 73 | ○- | ○ | ◎ | ◎ |
| Example 74 | ○- | ○ | ◎ | ◎ |
| Example 75 | ○ | ◎ | ◎ | ◎ |
| Example 76 | ◎ | ◎ | ◎ | ◎ |
| Example 77 | ○ | ◎ | ◎ | ◎ |
| Example 78 | ○ | ◎ | ◎ | ◎ |
| Example 79 | ○ | ◎ | ◎ | ◎ |
| Example 80 | ○ | ◎ | ◎ | ◎ |

TABLE 4-3

| Test level | Corrosion resistance | Adhesion | Conductivity | Shelf stability |
|---|---|---|---|---|
| Example 81 | ○ | ◎ | ◎ | ◎ |
| Example 82 | ○ | ◎ | ◎ | ◎ |
| Example 83 | ○ | ◎ | ◎ | ◎ |
| Example 84 | ○ | ◎ | ◎ | ◎ |
| Example 85 | ○ | ◎ | ◎ | ◎ |
| Example 86 | ○ | ◎ | ◎ | ◎ |
| Example 87 | ○- | ◎ | ◎ | ◎ |
| Example 88 | ○ | ◎ | ◎ | ◎ |
| Example 89 | ○ | ◎ | ◎ | ◎ |
| Example 90 | ○ | ◎ | ◎ | ◎ |
| Example 91 | ◎ | ◎ | ○ | ◎ |
| Example 92 | ◎ | ◎ | ○- | ◎ |
| Example 93 | ○ | ◎ | ◎ | ◎ |
| Example 94 | ◎ | ◎ | ◎ | ◎ |
| Example 95 | ◎ | ◎ | ◎ | ◎ |
| Example 96 | ◎ | ◎ | ◎ | ◎ |
| Example 97 | ◎ | ◎ | ○ | ◎ |
| Example 98 | ◎ | ◎ | ◎ | ◎ |
| Example 99 | ◎ | ◎ | ○- | ◎ |
| Example 100 | △ | ◎ | ◎ | ◎ |
| Example 101 | ○- | ◎ | ◎ | ◎ |
| Example 102 | ○ | ◎ | ◎ | ◎ |
| Example 103 | ○ | ◎ | ◎ | ◎ |
| Example 104 | ○ | ◎ | ◎ | ◎ |
| Example 105 | ○- | ◎ | ◎ | ◎ |
| Example 106 | ○ | ◎ | ◎ | ◎ |
| Example 107 | ◎ | ◎ | ○ | ◎ |
| Example 108 | ○ | ◎ | ◎ | ◎ |
| Example 109 | ◎ | ◎ | ○ | ◎ |
| Example 110 | ◎ | ◎ | ◎ | ◎ |
| Example 111 | ◎ | ○ | ○ | ◎ |
| Comparative Example 112 | △ | ◎ | ◎ | ◎ |
| Comparative Example 113 | X | △ | ◎ | ◎ |
| Comparative Example 114 | X | △ | ◎ | ◎ |
| Comparative Example 115 | ◎ | ○ | X | ◎ |
| Comparative Example 116 | ◎ | ○ | X | ◎ |
| Example 117 | ◎ | ◎ | ◎ | ◎ |
| Example 118 | ◎ | ◎ | ◎ | ◎ |
| Example 119 | ◎ | ◎ | ◎ | ◎ |
| Example 120 | ○ | ◎ | ◎ | ◎ |

TABLE 4-4

| Test level | | Corrosion resistance | Adhesion | Conductivity | Shelf stability |
|---|---|---|---|---|---|
| Example | 121 | ◎ | ◎ | ◎ | ◎ |
| Example | 122 | ◎ | ◎ | ◎ | ◎ |
| Example | 123 | ◎ | ◎ | ◎ | ◎ |
| Example | 124 | ◎ | ◎ | ◎ | ◎ |
| Example | 125 | ◎ | ◎ | ◎ | ◎ |
| Example | 126 | ◎ | ◎ | ◎ | ◎ |
| Example | 127 | ◎ | ◎ | ◎ | ◎ |
| Example | 128 | ◎ | ◎ | ○ | ◎ |
| Example | 129 | ◎ | ◎ | ◎ | ◎ |
| Example | 130 | ◎ | ◎ | ◎ | ◎ |
| Example | 131 | ◎ | ◎ | ○ | ◎ |
| Example | 132 | ◎ | ◎ | ◎ | ◎ |
| Example | 133 | ◎ | ◎ | ◎ | ◎ |
| Example | 134 | ○ | ◎ | ◎ | ◎ |
| Example | 135 | ○ | ◎ | ◎ | ◎ |
| Example | 136 | ○ | ◎ | ◎ | ◎ |
| Example | 137 | ◎ | ◎ | ◎ | ◎ |
| Example | 138 | ◎ | ◎ | ○ | ◎ |
| Example | 139 | ◎ | ◎ | ○- | ◎ |
| Example | 140 | ○ | ◎ | ◎ | ◎ |
| Example | 141 | ◎ | ◎ | ◎ | ◎ |
| Example | 142 | ◎ | ◎ | ◎ | ◎ |
| Example | 143 | ◎ | ◎ | ○ | ◎ |
| Example | 144 | ◎ | ◎ | ○ | ◎ |
| Example | 145 | ◎ | ◎ | ◎ | ◎ |
| Example | 146 | ◎ | ◎ | ○- | ◎ |
| Example | 147 | ○- | ◎ | ◎ | ◎ |
| Example | 148 | ○- | ◎ | ◎ | ◎ |
| Example | 149 | ○ | ◎ | ◎ | ◎ |
| Example | 150 | ◎ | ◎ | ◎ | ◎ |
| Example | 151 | ◎ | ◎ | ◎ | ◎ |
| Example | 152 | ○ | ◎ | ◎ | ◎ |
| Example | 153 | ○- | △ | ○- | ◎ |
| Comparative Example | 154 | X | X | ○ | ◎ |
| Comparative Example | 155 | X | X | △ | ◎ |

As described in Tables 4-1 to 4-4, each of the zinc-based metal coated steel sheets according to the present invention has excellent corrosion resistance, adhesion, and conductivity even if the steel sheet is in contact with, for example, a gasket at a low contact pressure. In contrast, in each of the comparative examples, in which any of the requirements is outside the appropriate range of the present invention, at least one of the corrosion resistance, adhesion, conductivity, and shelf stability was not sufficient.

It is possible to provide a zinc-based metal coated steel sheet including a film free from a pollution control substance, such as hexavalent chromium, the steel sheet having excellent properties, such as corrosion resistance and adhesion, and having excellent conductivity even under severe conditions where the steel sheet is in contact with, for example, a gasket at a low contact pressure, in particular, without reducing corrosion resistance. So, the zinc-based metal coated steel sheet of the present invention is significantly useful for components for use in, for example, automobiles, household electrical appliances, and OA equipment.

The invention claimed is:

1. A zinc-based metal coated steel sheet comprising:
a surface film arranged on a surface of a zinc-based metal coated layer, the surface film having a two-layer structure including a first layer and a second layer,
wherein the first layer is formed by applying a surface treatment liquid (A) for a zinc-based metal coated steel sheet to the surface of the zinc-based metal coated layer and performing drying by heating, the surface treatment liquid (A) containing a resin emulsion (a) that contains a cationic urethane resin emulsion (a-1) and/or a nonionic acrylic resin emulsion (a-2), the cationic urethane resin emulsion (a-1) containing at least one cationic functional group selected from primary to tertiary amino groups and quaternary ammonium salt groups, a tetraalkoxysilane (b), at least one silane coupling agent (c) that contains at least one reactive functional group selected from active hydrogen-containing amino groups, an epoxy group, a mercapto group, and a methacryloxy group, a chelating agent (d), a vanadic acid compound (e), a titanium compound (f), and water, the surface treatment liquid (A) having a pH of 3 to 6 and being adjusted so as to satisfy requirements (I) to (V) described below, wherein the second layer is formed by applying a surface treatment liquid (B) that contains an organic resin (g) to a surface of the first layer and performing drying by heating, and wherein the total thickness of the first layer and the second layer on a side of the steel sheet is in the range of 0.1 to 3.0 μm:
(I) the proportion of the solid ($a_S$) of the resin emulsion (a) is in the range of 11% to 45% by mass with respect to the total solid of the treatment liquid;
(II) the ratio by mass of the solid of the silane coupling agent (c) to the solid of the resin emulsion (a), i.e., ($c_S/a_S$), is in the range of 1.51 to 5.35;
(III) the ratio by mass of the solid of the tetraalkoxysilane (b) to the solid of the chelating agent (d), i.e., ($b_S/d_S$), is in the range of 0.15 to 1.49;
(IV) the ratio of the mass ($e_V$) of the vanadic acid compound (e) in terms of V to the mass of the solid ($d_S$) of the chelating agent (d), i.e., ($e_V/d_S$), is in the range of 0.03 to 0.23; and
(V) the ratio of the mass ($f_T$) of the titanium compound (f) in terms of Ti to the mass of the solid ($d_S$) of the chelating agent (d), i.e., ($f_T/d_S$), is in the range of 0.02 to 0.19.

2. The zinc-based metal coated steel sheet according to claim 1, wherein the organic resin (g) in the surface treatment liquid (B) contains an organic resin (g-1) that contains an OH group and/or a COOH group.

3. The zinc-based metal coated steel sheet according to claim 1, wherein the organic resin (g) in the surface treatment liquid (B) contains a hydrazine-modified organic resin (g-2) formed by reaction with an active hydrogen-containing compound (i) composed of a hydrazine derivative (h) in which some or all of compounds contain active hydrogen.

4. The zinc-based metal coated steel sheet according to claim 1, wherein the surface treatment liquid (B) further contains a rust preventive additive (j).

5. The zinc-based metal coated steel sheet according to claim 4, wherein the rust preventive additive (j) contains (k) and/or (l) described below, and when rust preventive additive (k) is contained in (j), the proportion of the rust preventive additive (k) is in the range of 1 to 100 parts by mass in terms of the solid content with respect to the total amount of 100 parts by mass of the organic resin (g) in the surface treatment liquid (B):
(k) Ca ion-exchanged silica; and
(l) silicon oxide.

6. The zinc-based metal coated steel sheet according to claim 1, wherein the surface treatment liquid (B) further contains a lubricant (m).

* * * * *